United States Patent
Yamaguchi et al.

[11] Patent Number: 6,065,858
[45] Date of Patent: May 23, 2000

[54] MILLING MACHINE AND METHODS OF MILLING AND MENU SELECTION

[75] Inventors: Shingo Yamaguchi; Tatsuo Kimura; Masayuki Imakado; Naoki Asano, all of Kawasaki, Japan

[73] Assignee: Fujitsu Limited, Kawasaki, Japan

[21] Appl. No.: 08/735,741

[22] Filed: Oct. 23, 1996

[30] Foreign Application Priority Data

Dec. 20, 1995 [JP] Japan ................................. 7-332413
Apr. 4, 1996 [JP] Japan ................................. 8-082758

[51] Int. Cl.[7] .............................. G06F 19/00; G06G 7/66
[52] U.S. Cl. ................................. 364/474.22; 364/474.24; 364/474.28
[58] Field of Search ........................ 364/474.22, 474.23, 364/474.18, 474.2, 474.24, 474.26, 474.28, 474.29, 474.03, 474.17

[56] References Cited

U.S. PATENT DOCUMENTS

| | | | |
|---|---|---|---|
| 4,618,924 | 10/1986 | Hinds ...................................... | 364/191 |
| 4,739,488 | 4/1988 | Kishi et al. ........................ | 364/474.18 |
| 5,095,440 | 3/1992 | Suzuki et al. ...................... | 364/474.33 |
| 5,175,407 | 12/1992 | Seki et al. .......................... | 364/474.28 |
| 5,363,308 | 11/1994 | Guyder ............................... | 364/474.29 |
| 5,513,310 | 4/1996 | Megard et al. ......................... | 395/161 |
| 5,583,408 | 12/1996 | Kurakake et al. .................. | 364/474.29 |

FOREIGN PATENT DOCUMENTS

| | | |
|---|---|---|
| 53-16179 | 2/1978 | Japan . |
| 6-274219 | 9/1994 | Japan . |
| 7-24688 | 1/1995 | Japan . |

*Primary Examiner*—William Grant
*Assistant Examiner*—Carolyn T. Baumgardner
*Attorney, Agent, or Firm*—Staas & Halsey

[57] ABSTRACT

Determining the intersection line of a plane $Z=Z1$ perpendicular to the axial direction of an end mill and a design surface, determining equal pitch offset-curves as path elements inside a material and outside the intersection line, determining intersection points crossing a material boundary from outside to inside as cutting start and end points and reverse respectively when going along the path, determining a tangent to the path element at the cutting start point and determining the intersection point of the tangent and a material boundary offset line outside the materials as the end mill approach start point. Determining a point at a minimum height on a design surface and determining such a ball end mill that a mill model does not interfere with the design surface when aligning the tip of the mill model with the point. When performing offset milling by a thickness $\delta$, making a mill model by reducing the outline of a rotating end mill by the thickness $\delta$, placing the model on the design surface to determine a path and actually cutting with the end mill along the path. Displaying a tree-type hierarchical menu and selecting one item of the lowest layer in the menu, resulting in selecting all related items in the hierarchical layers above it automatically.

14 Claims, 22 Drawing Sheets

MILLING MACHINE AND METHODS OF MILLING AND MENU SELECTION

BACKGROUND OF THE INVENTION

1. Field of the Invention

The present invention relates to a milling machine that is NC controlled and methods of milling and menu selection.

2. Description of the Related Art

FIG. 20 shows an object 11A which were mounted on a X-Y stage 10. Assume X-Y-Z rectangular coordinate system as illustrated.

A portion of a intersection line 13 of a plane 12 of Z being constant and an object 11A is formed by moving an end mill along the path, shown in FIG. 21, in order from outside to inside to cut a rectangular block material 14.

Reference character 11 is the design plane to form the object 11A. FIG. 22(A) shows the state that the material 14 is being cut with an end mill 16 along a path element L1 which is equal to the boundary of material 14. When going around on the path element L1 once, the end mill 16 is shifted into the inside path element. Similar processing is repeated. To cut near the intersection line 13 along a inside path element L2, the end mill 16 is turned around. Therefore, after the switchback, end mill 16 becomes the state shown in FIG. 22(B). The load of end mill 16 increases more than the case of FIG. 22(A).

Since there is not wastefulness in the conventional end mill path, it is efficient apparently. However, since the load of end mill 16 increases rapidly with the switchback path, end mill 16 becomes easy to damage, resulting in a short lifetime. Therefore, when manufacturing without an operator at night and end mill 16 being damaged, work would be stopped and the work efficiency becomes bad as a result.

By the way, when milling an indented surface of a work with a ball end mill, the larger the diameter of the ball end mill, the better efficiency is achieved in milling. This diameter is limited by the curvature of the indented surface. In the prior art, the operator takes into consideration the approximate contour of the indented surface of the work and, allowance for a margin, selects a ball end mill with a somewhat smaller diameter, resulting in a poor milling efficiency.

In addition, when performing slight offset milling over the entire surface after milling is performed in conformance to the design, a new design surface must be input to the computer to calculate the path of the ball end mill for the new design surface, causing the processing to become complicated.

Also, when issuing a milling command to the computer that controls the milling machine, a menu is displayed to select items in each hierarchical layer through the top down method. Therefore, the number of selections that must be made is large, resulting in poor operability and difficulty for the operator in grasping the overall menu structure.

SUMMARY OF THE INVENTION

Accordingly, an object of the present invention is to provide method and machine of milling that is capable of improving work efficiency as a result by making end mill load approximately constant to make the lifetime of the end mill longer.

Another object of the present invention is to provide a method of milling that is capable of selecting a ball end mill with a diameter that provides good efficiency.

A further object of the present invention is to provide a method of milling that is capable of performing offset milling faster.

A still further object of the present invention is to provide a method of menu selection that requires a small number of individual menu selection operations in a hierarchical structure and that facilitates understanding of the overall structure.

According to the 1st aspect of the present invention, there is provided a milling method using a processor, the method comprises the steps of: determining an end mill path from a design surface of an object, a shape of a block material and a shape of an end mill; cutting the block material by making the end mill move relatively to the block material along the end mill path with rotating the end mill in order to shape the block material into an object having the design surface; the method further comprises the steps of: finding an intersection line of a surface $Z=Z1$ perpendicular to Z axis and the design surface, the Z axis being an axial direction of the end mill; determining offset curves as elements of the end mill path, the elements having approximately equal pitch and being outside from the intersection line; and selecting the elements of the end mill path in order from outside to inside and making the end mill move along the end mill path inside the block material.

With the 1st aspect of the present invention, since the path have no switchback, the load of the end mill inside the block becomes approximately constant and the load never increases rapidly like the prior art, therefore the lifetime of the end mill becomes long and it is possible to improve cutting efficiency as a result.

In the 1st mode of the 1st aspect of the present invention, the method further comprises the steps of: finding an intersection line of a surface perpendicular to the direction Z and a side surface of the block material as a material boundary line; finding intersection points of one of the elements and the material boundary line; determining a cutting start point and a cutting end point which are the intersection point crossing the material boundary line from outside to inside and from inside to outside respectively when going along the one of the elements in a direction for the end mill to be moved; determining a tangent to the one of said elements at the cutting start point; determining a segment of the tangent from an end mill approach start point, which is outside the material boundary line, to the cutting start point as an entering path; and making the end mill move for the cutting start point along the entering path.

With the 1st mode, since the end mill enters into the block through the tangent at the cutting start point, large increase of the load of the end mill can be avoided and moreover, the control of the end mill near the cutting start point becomes easy.

In the 2nd mode of the 1st aspect of the present invention, the method further comprises the steps of: determining a material boundary offset line which is away from the material boundary line to outside by a length; and finding a intersection point of the material boundary offset line and the tangent as the end mill approach start point.

With the 2nd mode, since the intersection point of the material boundary offset line and the tangent is made as the end mill approach start point, the entering path can be easily determined.

In the 3rd mode of the 1st aspect of the present invention, the method further comprises the steps of: determining an end mill exiting path which is a segment line from the cutting end point to the end mill approach start point; and making the end mill move from the cutting end point to the end mill approach start point along the exiting path.

With the 3rd mode, the exiting path can be easily determined, and since the path outside the material becomes simple with two straight lines of the exiting path and the entering path, the movement control becomes easy, and moreover the movement distance outside the material becomes short generally.

In the 4th mode of the 1st aspect of the present invention, the method further comprises the steps of: determining an area having a width of the end mill around the exiting path; judging whether or not the area interferes with the block material; and when having judged as interfering, changing the exiting path into a line which have first and second segment lines extending from the cutting end point and the end mill approach start point respectively in the Z direction to approximate upper plane positions of the block material and a segment line linking both upper end points of the first and second segment lines.

With the 4th mode, it is possible to determine the path, which doesn't interfere with the material, outside the material, and the moving distance outside the material becomes shorter generally than the case moving along the side surface of the material.

In the 5th mode of the 1st aspect of the present invention, the method further comprises the steps of adding data on a scan order, rotating and moving speeds of the end mill as attribute data to data on the exiting path, the entering path and the path elements inside the block material.

According to the 2nd aspect of the present invention, there is provided a milling machine for determining an end mill path from a design surface of an object, a shape of a block material and a shape of an end mill, and cutting the block material by making the end mill move relatively to the block material along the end mill path with making the end mill rotate in order to shape the block material into an object having the design surface, the machine comprising a processor for: finding an intersection line of a surface Z=Z1 perpendicular to Z axis and the design surface, the Z axis being an axial direction of the end mill; determining offset curves as elements of the end mill path, the elements having approximately equal pitch and being outside from the intersection line; and selecting the elements of the end mill path in order from outside to inside and making the end mill move along the end mill path inside the block material.

According to the 3rd aspect of the present invention, there is provided a milling method comprising the steps of selecting a ball end mill, determining a path of the ball end mill for design surface based upon the design surface and a shape of the ball end mill, and moving the ball end mill along the path with rotating the ball end mill to make a work surface close to the design surface, the method further comprising, in order to select the ball end mill, the steps of: (1) finding a point of an approximate minimum height on the design surface as a judging point when height direction Z extending from a tip to the other end of the ball end mill is set; and (2) selecting such a ball end mill from a plurality of ball end mills that the ball end mill have a maximum diameter in those not interfering with the design surface when the tip of the ball end mill is aligned with the judging point; wherein the steps (1) and (2) are executed by a computer.

With the 3rd aspect of the present invention, an advantage is achieved in that an operator can select a ball end mill with a diameter that provides maximum efficiency without having to take into consideration the contour of the design surface. In addition, since an approximate minimum height on the design surface is set as the judging point for ball end mill interference, an advantage is achieved in that height speed processing becomes possible.

In the 1st mode of the 3rd aspect of the present invention, the step (1) comprises the step of: (1—1) finding each of intersecting lines of a plurality of planes parallel to an X-Z plane in an X-Y-Z rectangular coordinate system and the design surface as an X-Z cross sectional line and finding each of intersecting lines of a plurality of planes parallel to an Y-Z plane and the design surface as an Y-Z cross sectional line; and (1-2) finding a minimum Z point from points on the X-Z cross sectional lines and the Y-Z cross sectional lines as the judging point.

With the 1st mode, since the judgment point on the design surface with a 3-dimensional shape is determined by obtaining the minimum value on the 2-dimensional cross sectional line, an advantage is achieved in that the judging point can be determined easily and quickly.

In the 2nd mode of the 3rd aspect of the present invention, the step (1-2) comprises, when X or Y is designated as U, a range U of a U–Z cross sectional line is U1≦U≦U2 and ϵ is a allowable error, the step of: (a) setting UA=U1 and UB U2; (b) determining a height Z=Zp and an inclination m of the U-Z cross sectional line at a middle point UM satisfying UM=(UA+UB)/2; and (c) if |m|>ϵ then determining U at another point on the U-Z cross sectional line satisfying Z=Zp, substituting U in UA, substituting UM in UB and returning to step (b), else determining Zp as a minimum value.

With the 2nd mode, since the minimum height is searched with forecasting a point of minimum height, an advantage is achieved in that the judging point can be determined even faster.

In the 3rd mode of the 3rd aspect of the present invention, the step (2) comprises the steps of: obtaining a profile of the ball end mill as a mill model; aligning a tip of the mill model with the judging point; and judging that the ball end mill interferes with the design surface if the mill model intersects the X-Z cross sectional line or the Y-Z cross sectional line.

With the 3rd mode, since the judgement is made as to whether or not the ball end mill interferes with the design surface by aligning the tip of the mill model with the judging point on the cross sectional line, an advantage is achieved in that a more accurate judgement can be made.

In the 4th mode of the 3rd aspect of the present invention, the step (2) comprises the steps of: determining curvature radii of the X-Z cross sectional line and the Y-Z cross sectional line at the judging point; and judging that the ball end mill interferes with the design surface if rp<D/2, where D is a diameter of the ball end mill and rp is a smaller curvature radius in the curvature radii.

In the 5th mode of the 3rd aspect of the present invention, the step (2) comprises the steps of: determining curvature radii of the X-Z cross sectional line and the Y-Z cross sectional line at the judging point and in a vicinity thereof; and judging that the ball end mill interferes with the design surface if rp <D/2, where D is a diameter of the ball end mill and rp is a smallest curvature radius in the curvature radii.

With the 4th or 5th modes, since the ball end mill can be selected without using a mill model, the processing is simplified.

According to the 4th aspect of the present invention, there is provided a milling method comprising the steps of selecting a ball end mill, determining a path of the ball end mill for a new design surface based upon the new design surface and a shape of the ball end mill, and moving the ball end mill along the path with rotating the ball end mill to make a work surface close to the new design surface, the method further comprising, in case of the work surface being approximately a former design surface and the new design surface being inside of the work by a thickness δ from the former design surface, the steps of: determining a mill model by reducing a profile of the ball end mill by the thickness δ; determine a path of the mill model for getting the former design surface; and moving the end mill along the path to make the work surface into the new design surface.

With the 4th aspect of the present invention, since it is not necessary to derive the new design surface and a mill path therefor, the processing is simplified and an advantage is achieved in that offset milling can be performed faster.

According to the 5th aspect of the present invention, there is provided a method of menu selection using a computer and a display device, comprising the steps of displaying a menus on a screen of the display device and inputting commands corresponding to menu selections into the computer, wherein the menus is displayed in a tree-type hierarchical structure and when one item in the menu is selected all related items in hierarchical layers above the one item are selected.

With the 5th aspect of the present invention, since the number of operations required for item selection are reduced, the operability is improved. Also, it becomes easier for an operator to grasp the overall structure.

In the 1st mode of the 5th aspect of the present invention, there is provided a milling method using a computer and a display device, comprising the steps of displaying a menus on a screen of the display device, inputting commands corresponding to menu selections into the computer, selecting a ball end mill, determining a path of the ball end mill for a new design surface based upon the new design surface and a shape of the ball end mill, and moving the ball end mill along the path with rotating the ball end mill to make a work surface close to the new design surface, wherein the menus is displayed in a tree-type hierarchical structure and when one item in the menu is selected all related items in hierarchical layers above the one item are selected.

DESCRIPTION OF THE PREFERRED EMBODIMENTS

Figure 5:
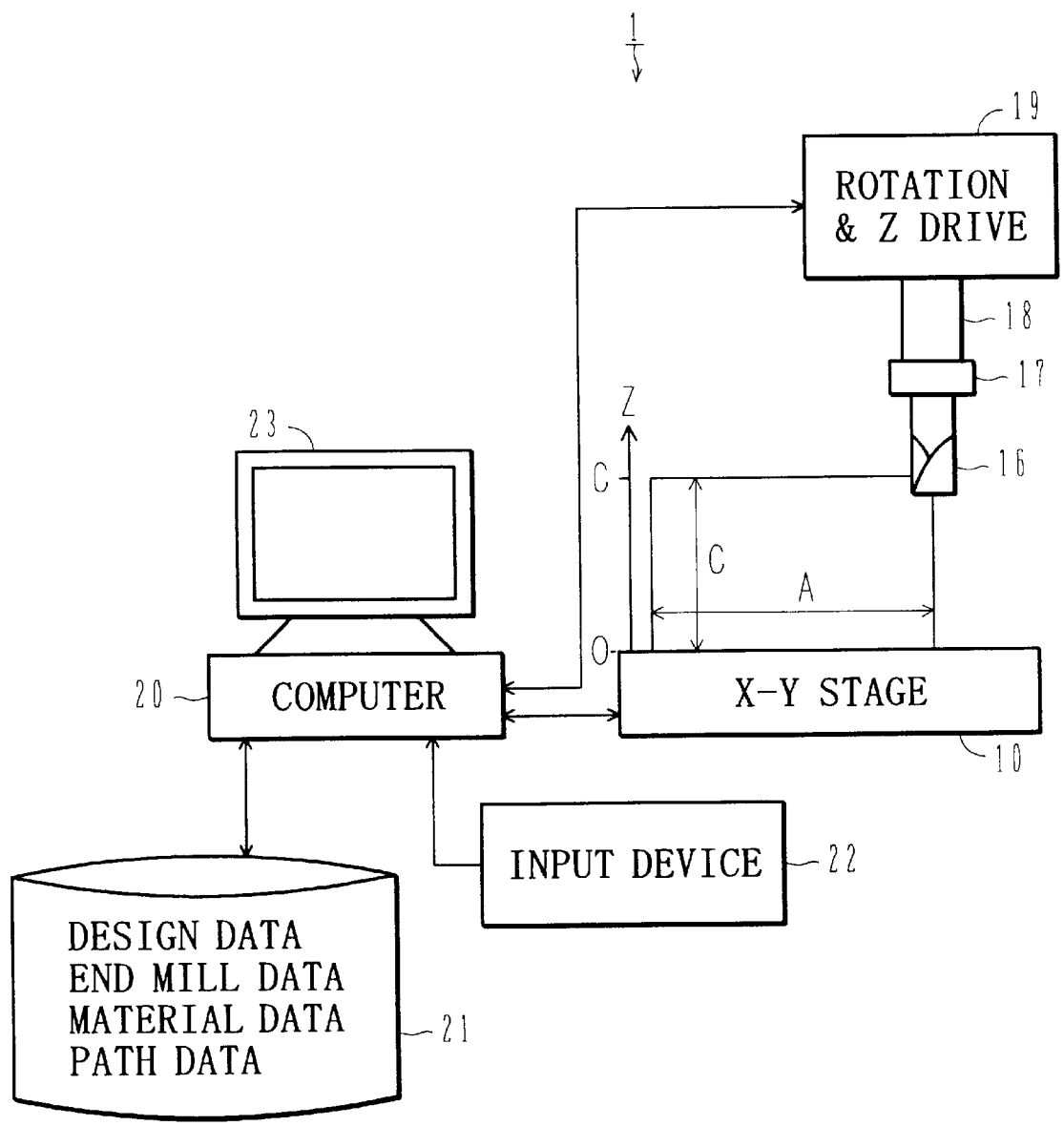
FIG. 5 is a block diagram showing a milling CAM of an embodiment in accordance with the present invention.

Referring now to the drawings, a preferred embodiments of the present invention is described below.
Milling Method and Machine FIG. 5 shows a schematic structure of a milling CAM 1.

Figure 20:
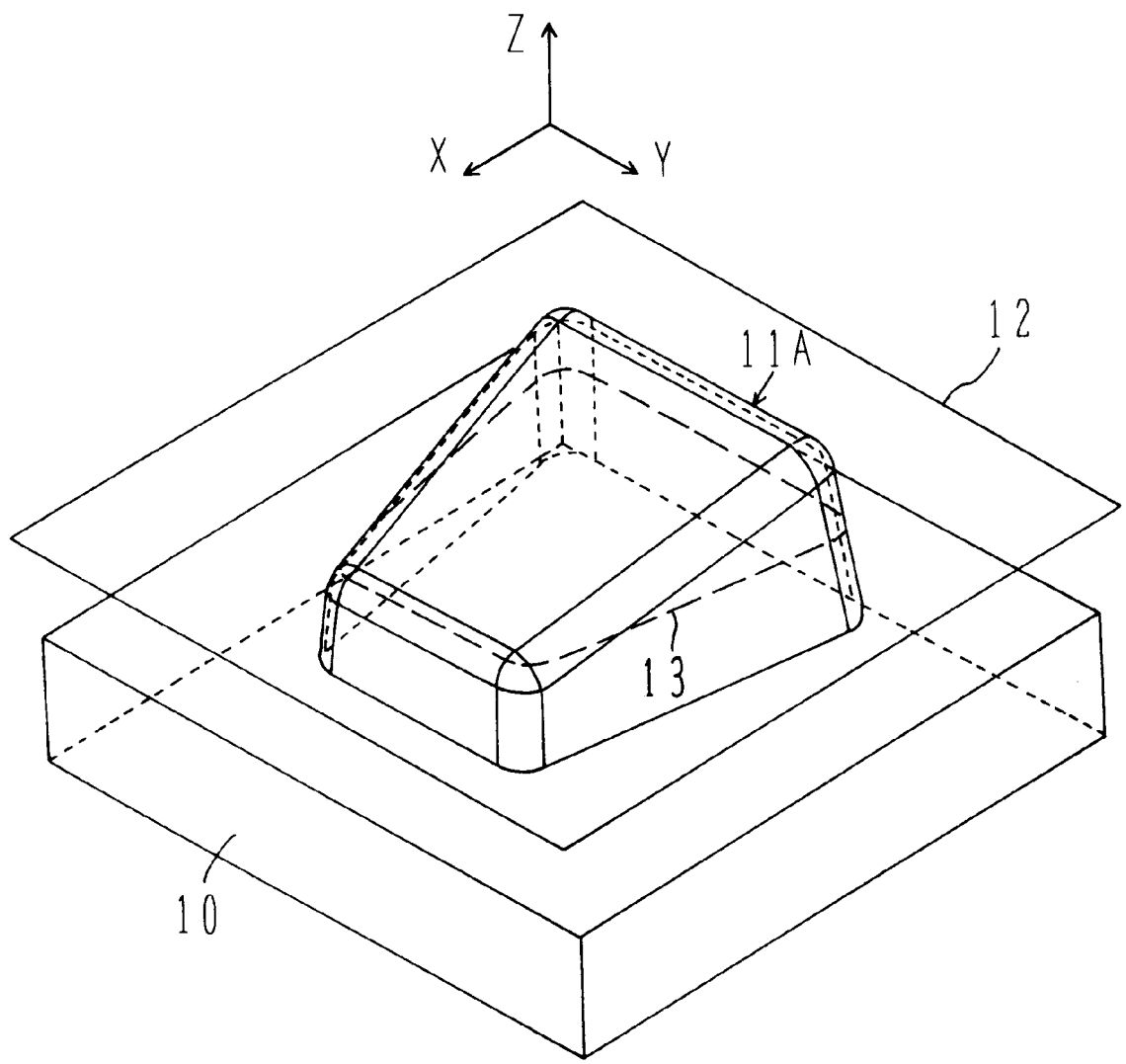
FIG. 20 is a perspective view showing an object mounted on an X-Y stage.
Figure 21:
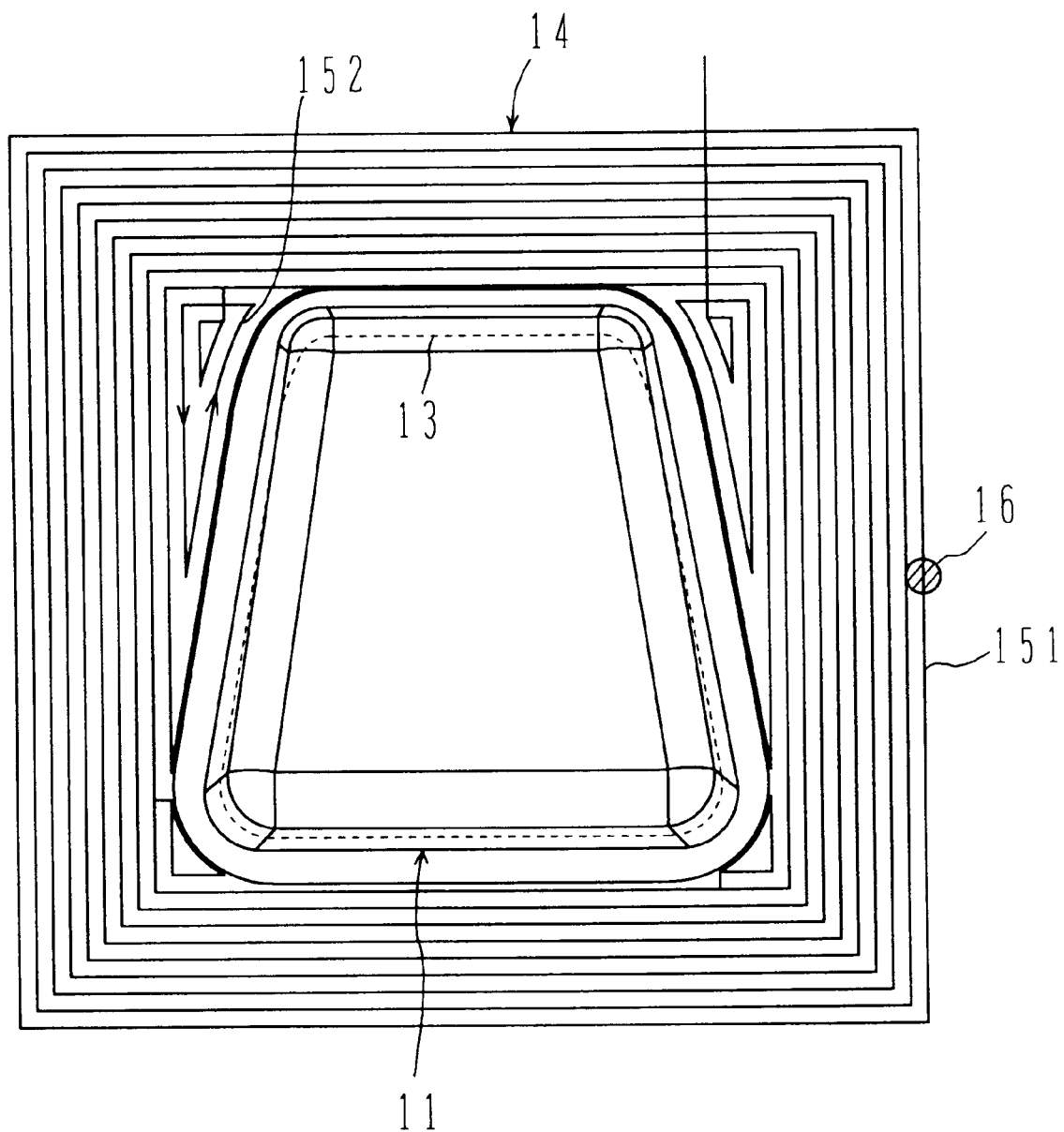
FIG. 21 is a plan view showing a conventional end mill path for cutting a material to shape an object.
Figure 22A:
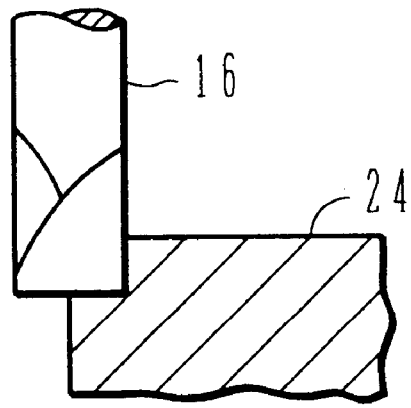
FIG. 22(A) is a partial sectional view at the end mill position when cutting along the path element L1 of FIG. 21
Figure 22B:
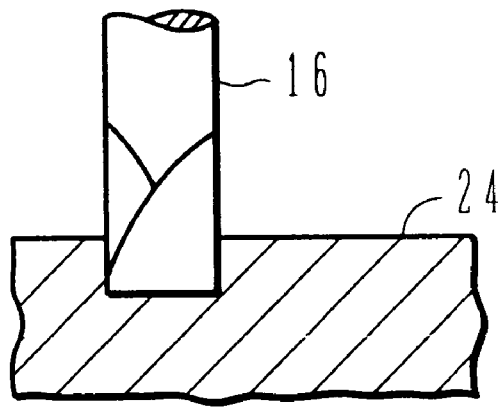
FIG. 22(B) is a partial sectional view at the end mill position when cutting along the path element L2 of FIG. 21.

The X-Y stage 10, material 14 and end mill 16 are identical with those shown in above-mentioned FIG. 20 and FIG. 21 and it is explained to cut material 14 with end mill 16 to shape the object 11A of FIG. 20.

The end mill 16 is attached through a spindle head 17 to a spindle 18 and is rotated and moved in the axial direction (Z direction) of end mill 16 by a rotation & Z drive device 19. The X-Y stage 10 and the rotation & Z drive device 19 are the control object of the milling machine and are controlled by a computer 20. Design data to form the object 11A of FIG. 20, data about the kind and size of end mills, and data about the kind and size of the material 14 was stored in a storage 21. Based on these data, the computer 20 makes end mill path data as below. The choice of end mill 16, the degree of finishing (rough, middle and fine) and the cutting command and so on are interactively inputted using an input device 22 and a display unit 23.

In response to the cutting start signal from the input device 22, based on the path data stored in the storage 21, computer 20 make the end mill 16 rotate, the X-Y stage 10 move in a X-Y plane and end mill 16 move to the Z direction to cut it, forming the object 11A.

Now referring to flow charts of FIGS. 1 to 4, a method of end mill path making by using the computer 20 is described.

Hereafter,the numerical values within parentheses indicate step identification numbers used in the figures.

(30) An operator inputs the width A, depth B and height H of the rectangular solid material 14 and a step ΔZ of the Z axis by means of the input device 22 and selects a kind and a size of the end mill 16 from a displayed menu on the screen of the display unit 23. The step ΔZ is a cutting depth which depends on end mill 16. These input data are stored in storage 21.

(31) Initial value C-ΔZ is substituted in the position Z1, in the Z direction, of the central bottom tip of the end mill 16.

(32) An intersection line 13 (FIG. 6) of the design surface 11 and a plane Z=Z1 is found.

Figure 6:
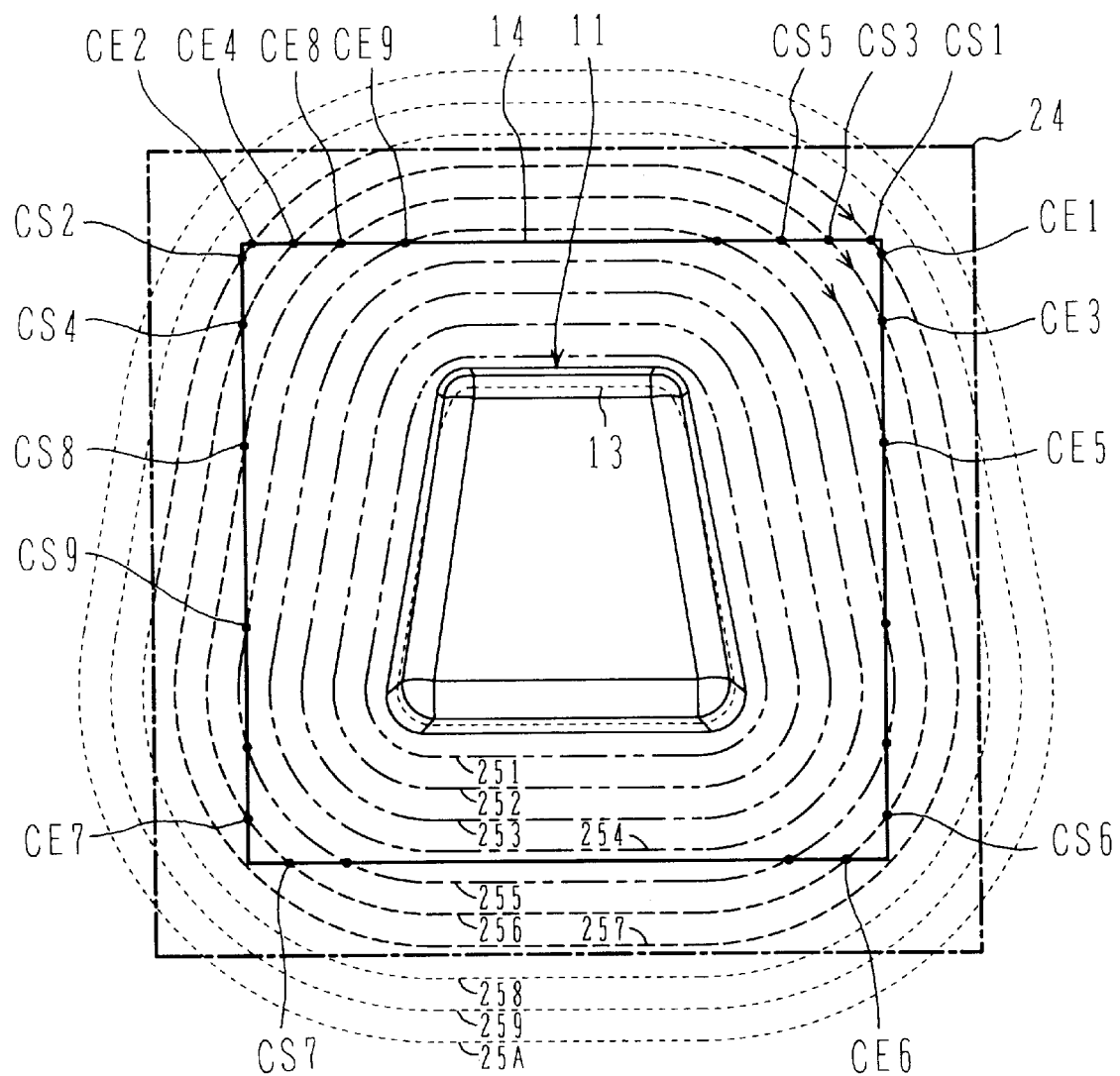
FIG. 6 illustrates the processing performed at steps 32 and 33 of FIG. 1 and at steps 41, 43 and 44 of FIG. 2.

(33) As shown in FIG. 6, equal pitch offset curves 251 to 259 and 25A outside the intersection line 13 are determined as path elements of the end mill 16. The lines which exists outside material 14 are invalid and deleted at later processing.

(34) The data on the determined path is stored in storage 21.

(35) The value of Z1 is decremented by the step ΔZ.

(36) If Z1<0 then the operation returns to step 32 and the above processing is repeated until Z≧0.

In FIG. 6, the outside of material 14 is a non-cutting area and in this area, end mill 16 should move quickly. The path elements outside the material 14 will be made as composition of exiting paths from inside to outside of the material 14 and entering paths from outside to inside of the material 14. Now referring to FIG. 2, a method of entering path making is described.

Figure 1:
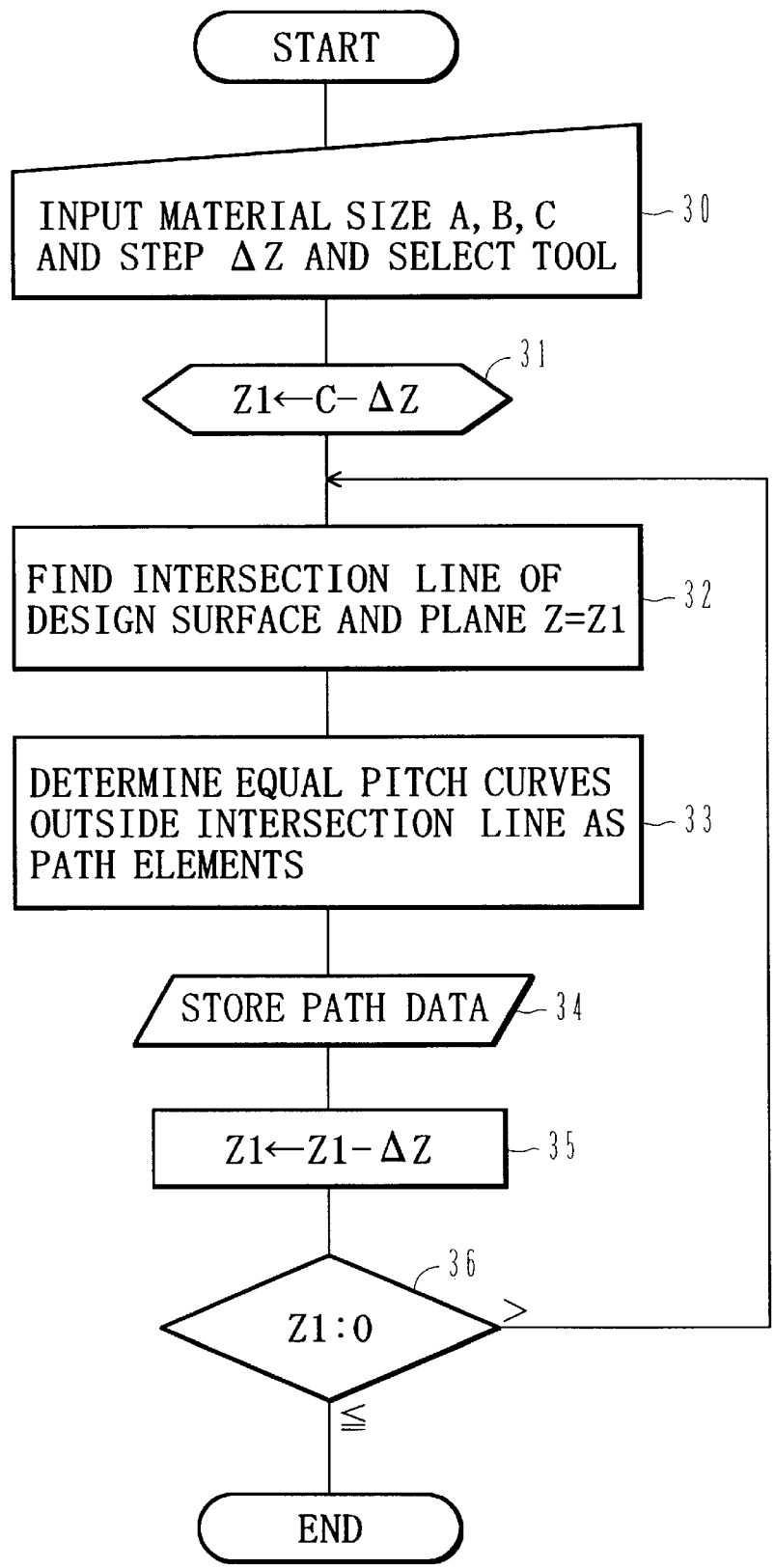
FIG. 1 is a flow chart showing a method of determining end mill path elements inside a material.
Figure 2:
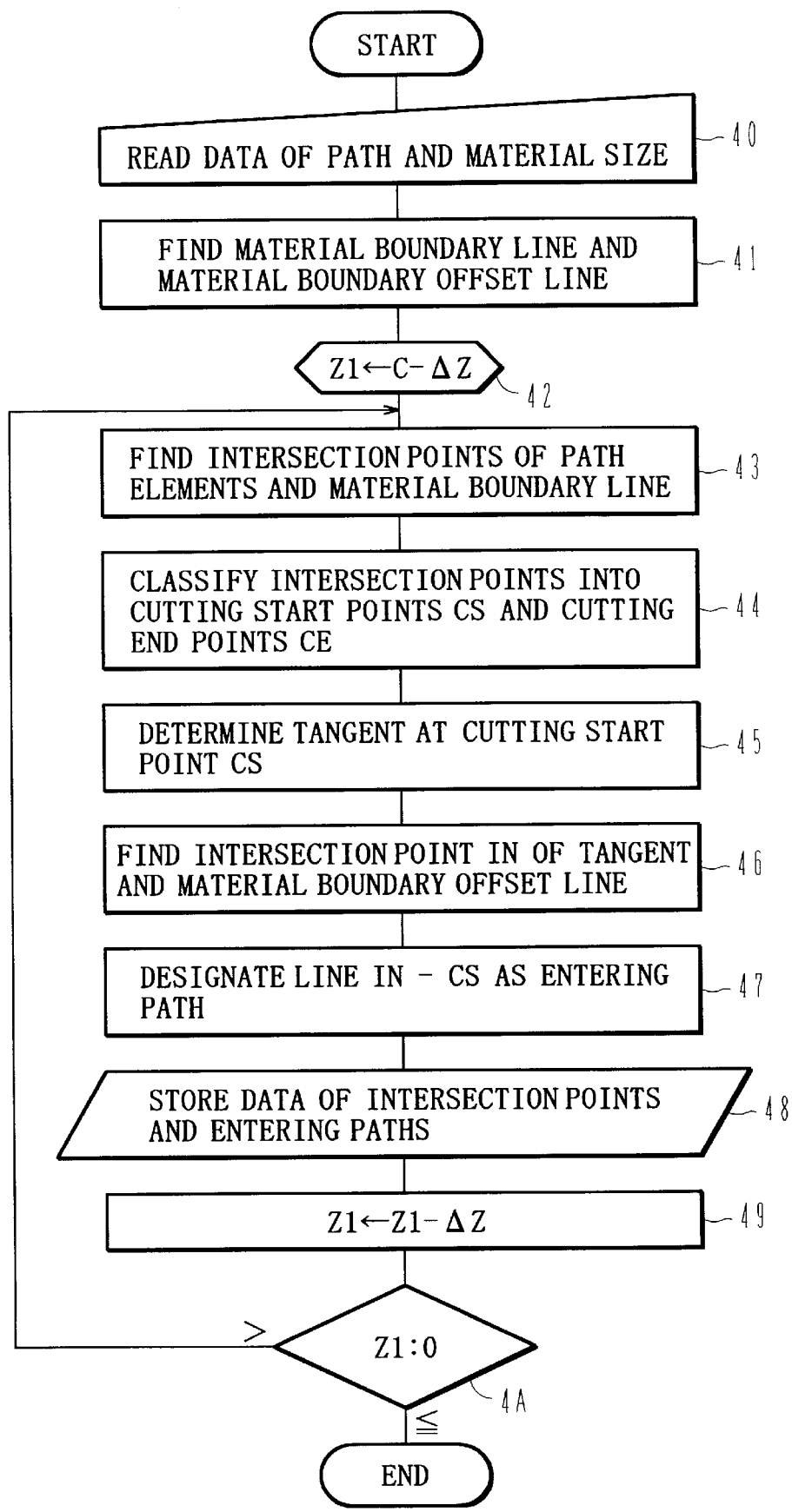
FIG. 2 is a flow chart showing a method of determining path elements to approach from outside to inside of the material.

(40) The data on path and material size which was stored in storage 21 at the processing of FIG. 1 are read out.

(41) The Block 14 is mounted on the X-Y stage 10 at a fixed position and a cross-sectional boundary line of the material 14 is found from this position and the material size. Next, a material boundary offset line 24 which is at a fixed distance, e.g. about (the diameter of the end mill 16)+(3 to 5) mm, away outside from this boundary line is found.

(42) An initial value C-ΔZ is substituted in Z1.

(43) The intersection points of the path elements 251 to 259, and 25A and the above-described boundary line of the material 14 are found. Path elements 258, 259 and 25A outside the material 14 are unnecessary and are deleted.

(44) These intersection points are classified into cutting start points CS which are end ones of the entering paths and cutting end points CE which are start ones of the exiting paths. Namely, in FIG. 6, about each path elements 255 to 257, the cutting start point CS and the cutting end point CE respectively are the points crossing the boundary of the material 14 from outside to inside and from inside to outside when moving along the path in the arrow direction shown. In FIG. 6, reference characters are attached to only nine sets of cutting start points CS1 to CS9 and cutting end points CE1 to CE9.

(45) A tangent to the path at a cutting start point CS is determined. When the straight lines 261 to 264 are extended in FIG. 7, they are the tangents at the cutting start points CS1 to CS4 respectively. In the tangent, the portion from the cutting start point CS to inside of the material 14 is ignored hereafter.

Figure 7:
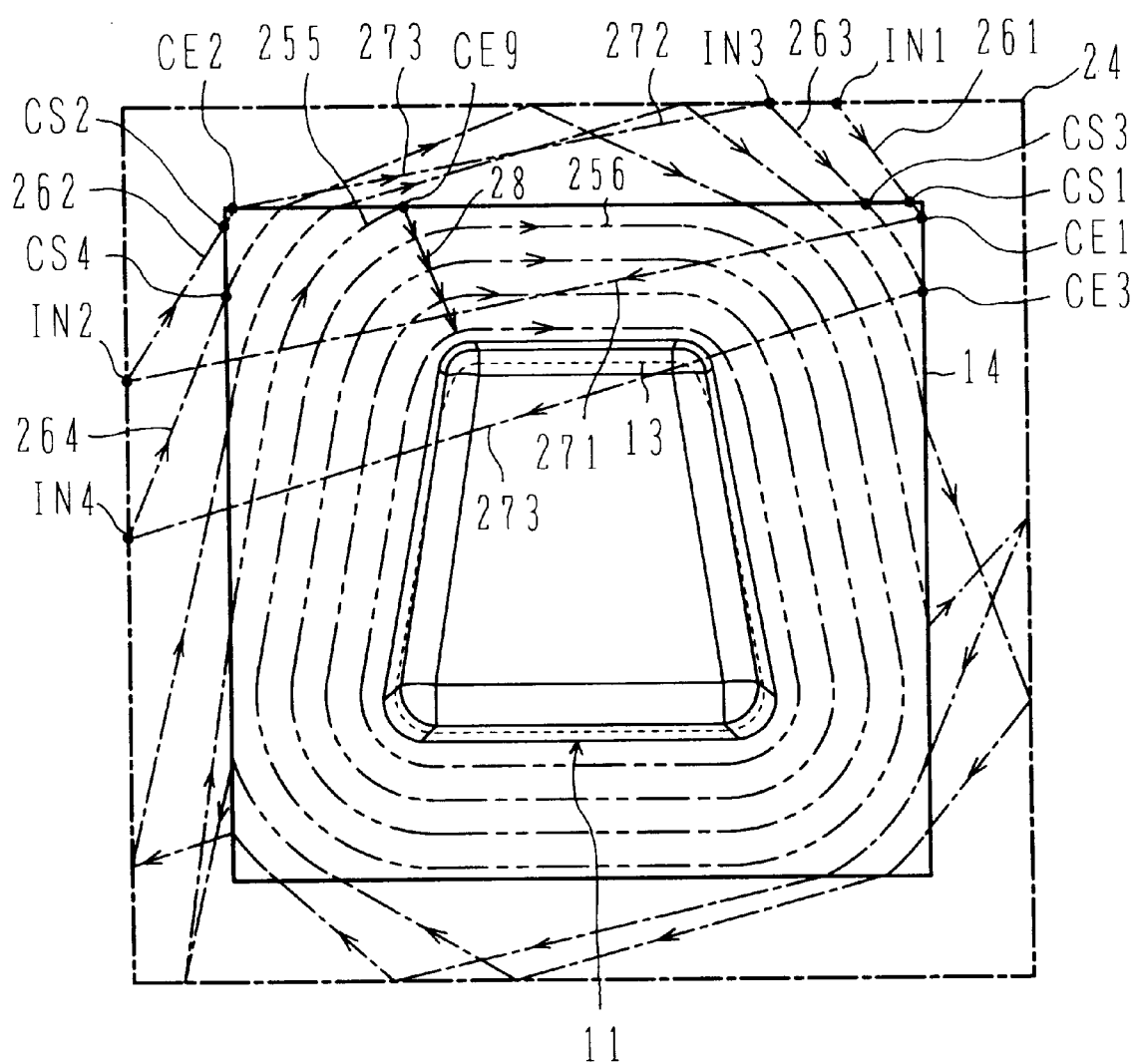
FIG. 7 illustrates the processing performed at steps 45 to 47 of FIG. 2.

(46) The intersection point IN of this tangent and the material boundary offset line 24 is found as the end mill approach start point. In FIG. 7, the end mill approach start points IN1 to IN4 are the intersection points of straight lines 261 to 264 and the material boundary offset line 24 respectively. In FIG. 7, the end mill approach start point IN1 is a start point of the whole path in a plane Z=Z1.

(47) Segment line IN-CS is designated as a entering path. Reference characters 261 to 264 of FIG. 7 are entering paths.

As a result, since the end mill 16 enters into the material 14 through the tangent at the cutting start point CS, the increase of the load of the end mill 16 can be avoided and moreover, the control of the end mill 16 near the cutting start point CS becomes easy. Also, since the intersection point IN of the material boundary offset line 24 and the tangent is the end mill approach start point, the entering path IN-CS can be easily determined.

(48) The data on the intersection points classified as above and the entering paths are stored into storage 21.

(49) The value of Z1 is decremented by the step ΔZ.

(4A) If Z>0 then the operation returns to above step 43, and the above processing repeats until Z1≧0.

It is to be noted that the material 14 isn't limited to a rectangular parallelepiped. When the material 14 is a rectangular parallelepiped, since the intersection point and the entering path are identical about each plane Z=Z1, the result which was determined in plane Z=C-ΔZ may be used in the other planes Z=Z1.

Figure 3:
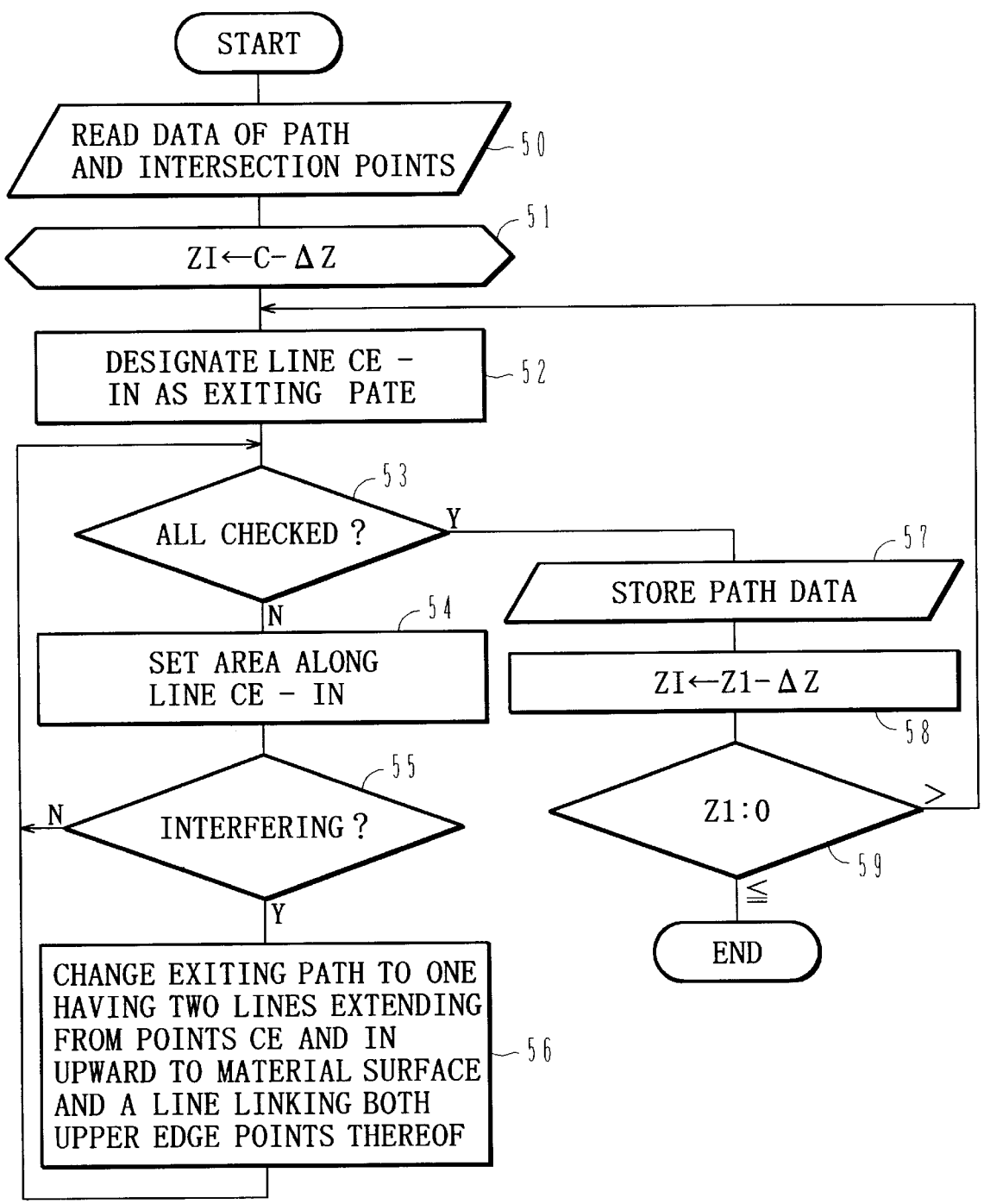
FIG. 3 is a flow chart showing a method of determining path elements to exit from inside to outside of the material.

Now referring to FIG. 3, a method of making an exiting path outside material 14 is described.

(50) The data on the path and intersection points are read out of storage 21.

(51) Initial value C-ΔZ is substituted in Z1.

(52) A segment line CE-IN is designated as the exiting path. Reference characters 271–273 of FIG. 7 are exiting paths. The exiting locus is connected with the entering locus in such a way that the path inside the material continues in order from outside to inside.

(53) If the interference check to be described at below steps 54 and 55 hasn't ended about all the segment lines CE-IN, the operation goes to step 54, else the operation goes to step 57.

Figure 8A:
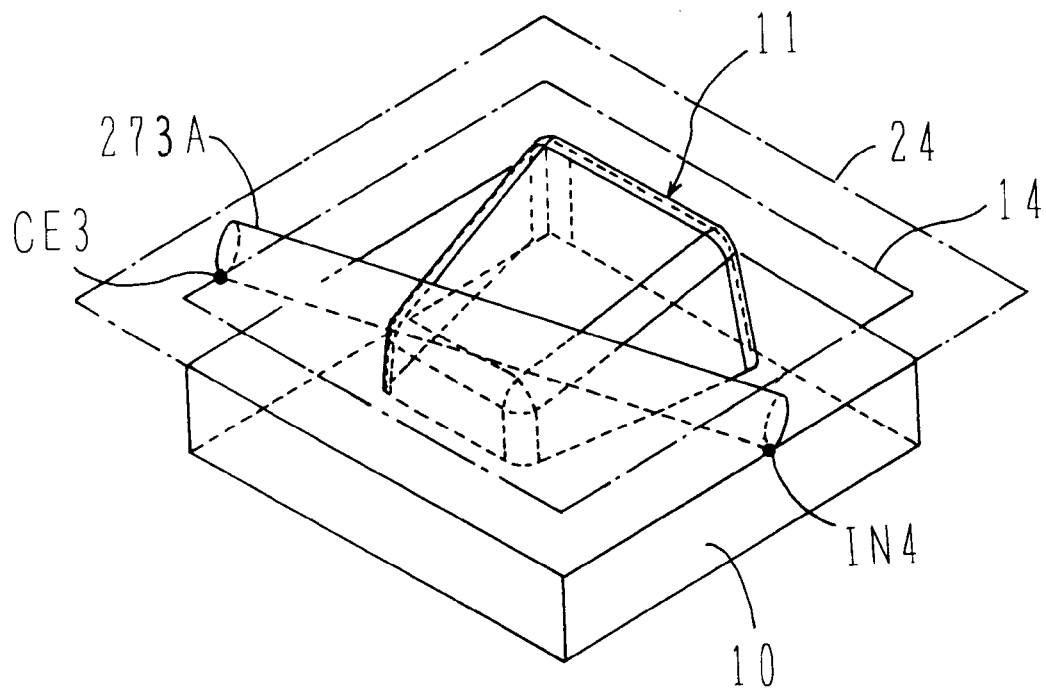
FIG. 8(A) illustrates the processing performed at step 54 of FIG. 3 and FIG. 8(B) illustrate the processing performed at step 56 of FIG. 3.

(54) The area where end mill 16 having a diameter goes along the segment line CE-IN is set. For example, in case of the ball end mill, the column, which diameter is equal to that of end mill 16, like 273A of FIG. 8(A) is assumed as this area. The area is easily set by making the bottom line of the column coincide with the segment line CE3-IN4. In case of a flat end mill, this column should be replaced with a prism.

(55) If the above area isn't interfering with the material 14, the segment line CE-IN determined at step 52 is made effective and the operation returns to step 53, else the operation goes to step 56.

(56) The exiting path is changed to the line which have two segment lines extending from the cutting end point CE and the end mill approach start point IN each upward to the points far above 1–2 mm from the surface of the material 14 and a segment line linking both upper edge points thereof.

Figure 8B:
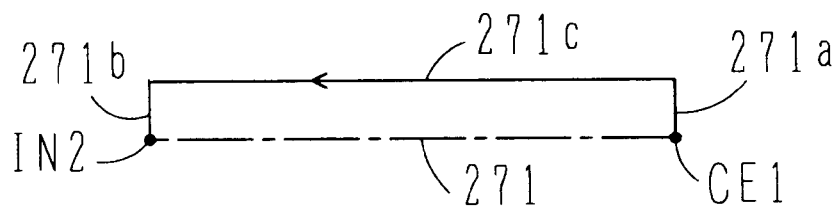

For example, the exiting path 271 of FIG. 7 is changed into the one having segment lines 271a, 271c and 271b linked as shown in FIG. 8(B). The segment lines 271a and 271b are extending respectively from the cutting end point CE1 and the end mill approach start point IN2 of FIG. 7 to the points which are slight above the upper surface of material 14. The segment line 271c is between the upper ends of the segment lines 271a and 271b. Next, the operation returns to above step 53.

(57) The data on the determined path is stored into storage 21.

(58) The value of Z1 is decremented by the step ΔZ.

(59) If Z>0 then the operation returns to above step 52, and the above processing repeats until Z1≧0.

It is to be noted that the material 14 isn't limited to the rectangular parallelepiped. When the material 14 is a rectangular parallelepiped, since the exiting path is identical except for the length of the straight line in the direction of the height in step 56 about each plane Z=Z1, the exiting path which was determined in plane Z=C-ΔZ may be used in the other plane Z=Z1.

Figure 4:
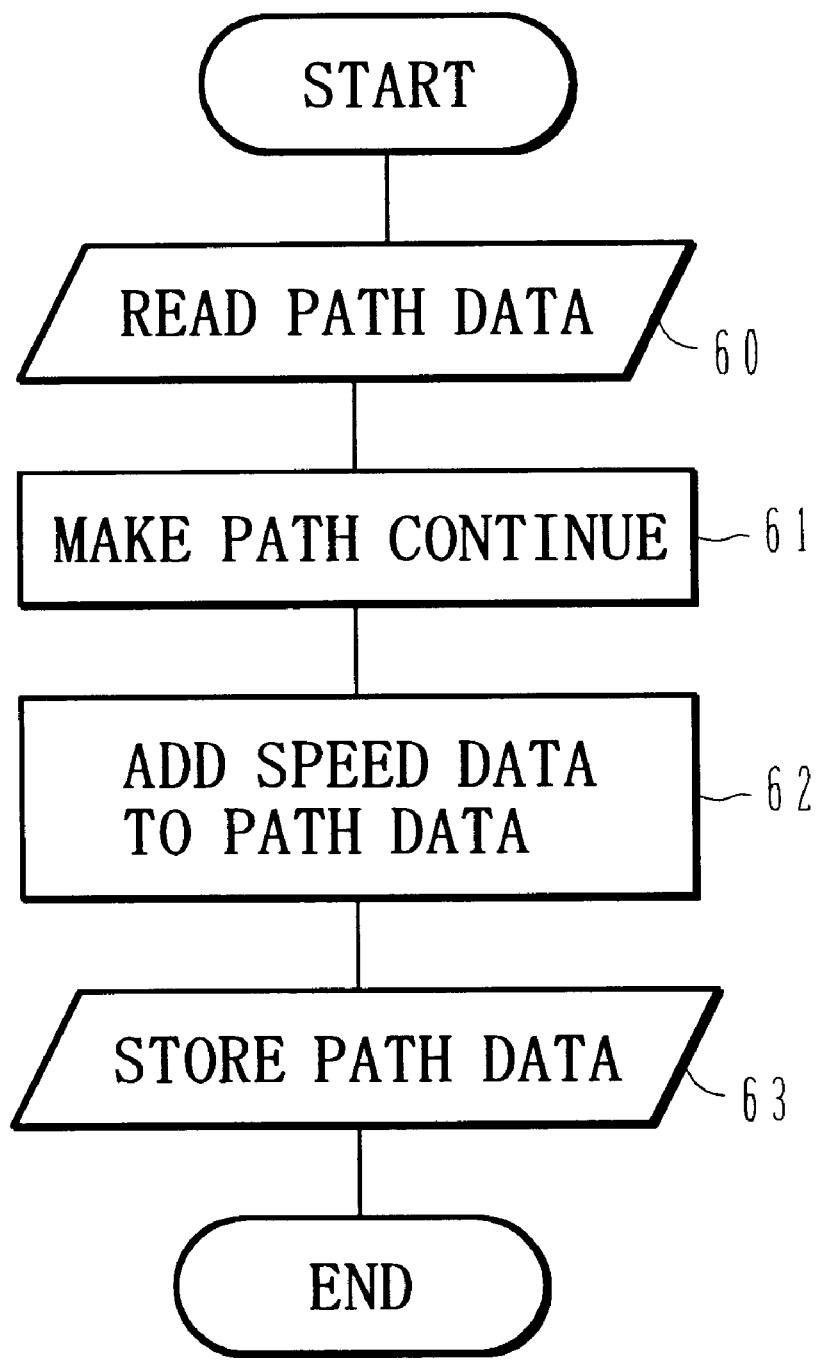
FIG. 4 is a flow chart showing dynamic attribute addition to the path data.

Now referring to FIG. 4, dynamic-attribute attaching to the path data is described.

(60) The path data is read out of the storage 21.

(61) In FIG. 7, since the end mill approach start point IN which corresponds to the cutting end point CE9 doesn't exist, the crossing path 28 which is perpendicular to the path element 255 at the cutting end point CE9 is made. The path sifts from the cutting end point CE9 through the crossing path 28 to the inside adjacent path element and move around on this path element. Next, the path sifts through the crossing path 28 to the inside adjacent path in the same way and this is repeated continuously until no path element.

(62) data on the movement and rotation speeds of the end mill 16 are added to each path element data. End mill 16 is to be moved at height speed at outside of the material 14 and the area where the end mill 16 doesn't interfere with the material 14. For example, when this height speed is set to 1000, the speed inside the material 14 is set to 100.

As a result, outside the material 14, since the end mill 16 is able to move at height speed and the path elements are made such that the moving distance becomes short, the time for passing outside the material is sufficiently small compared with the whole cutting time.

In regard to the range that the end mill 16 interferes with the material 14 on the entering path, the movement speed of the end mill 16 is set to 30 for example to avoid the rapid increase of the load of the end mill 16. Since this range is like the diameter of the end mill 16, even if this speed is about ⅓ of that inside material 14, the rate of its time to the whole cutting time is rather small.

(63) The path data having the dynamic attribute as above is stored in the storage 21.

By making end mill 16 move along the path determined as above, the material 14 is cut to form the object and since this path have no switchback, the load of the end mill 16 inside the material 14 becomes approximately constant. The load never increases rapidly like the prior art, therefore the lifetime of the end mill 16 becomes long and it is possible to improve cutting efficiency as a result.

CAD/CAM System

Figure 9:
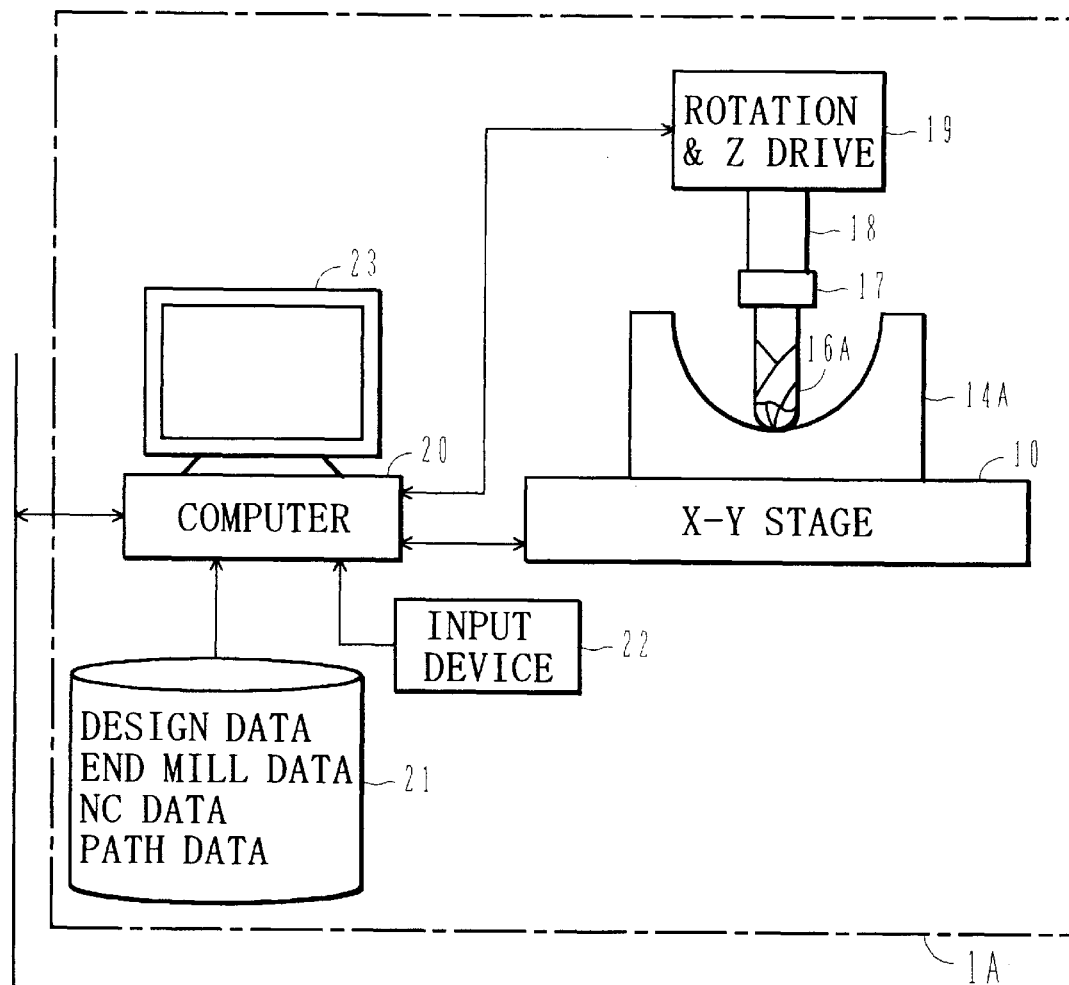
FIG. 9 is a block diagram of a milling CAD/CAM system in another embodiment according to the present invention.
Figure 9:
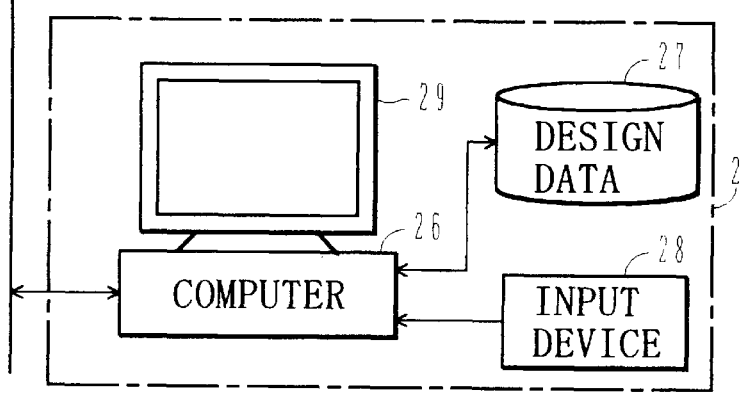

FIG. 9 shows a schematic structure of a milling CAD/CAM system.

A plurality of CAM 1A and a plurality of CAD 2, connected by a LAN, are provided in a factory. Each CAM 1A is like the CAM 1 of FIG. 5.

Data on available end mills and contour data on the design surface of a work WK that are transferred from the CAD 2 are stored in the storage 21. The computer 20 determines a path for the end mill 16A in correspondence to the design surface and the shape of the selected end mill 16A, stores it in the storage 21, prepares NC data using the determined path, the type and size of the end mill and the degree of finishing and stores them in the storage 21. Then, in response to a milling start signal, it drives the X-Y stage 10 and the rotation Z drive device 19 based upon these NC data to perform milling in such a manner that the milling surface of the work WK matches the design surface.

The CAD 2 for preparing design data is a computer system constituted by connecting a storage 27, an input device 28 and a display unit 29 to a computer 26.

Ball End Mill Selection

A program for selecting the ball end mill 16A with a diameter that provides a height degree of efficiency in milling when milling an indented surface with a ball end mill 16A is stored in a storage within the computer 20, and this program is explained in reference to FIGS. 10 to 13.

Figure 12A:
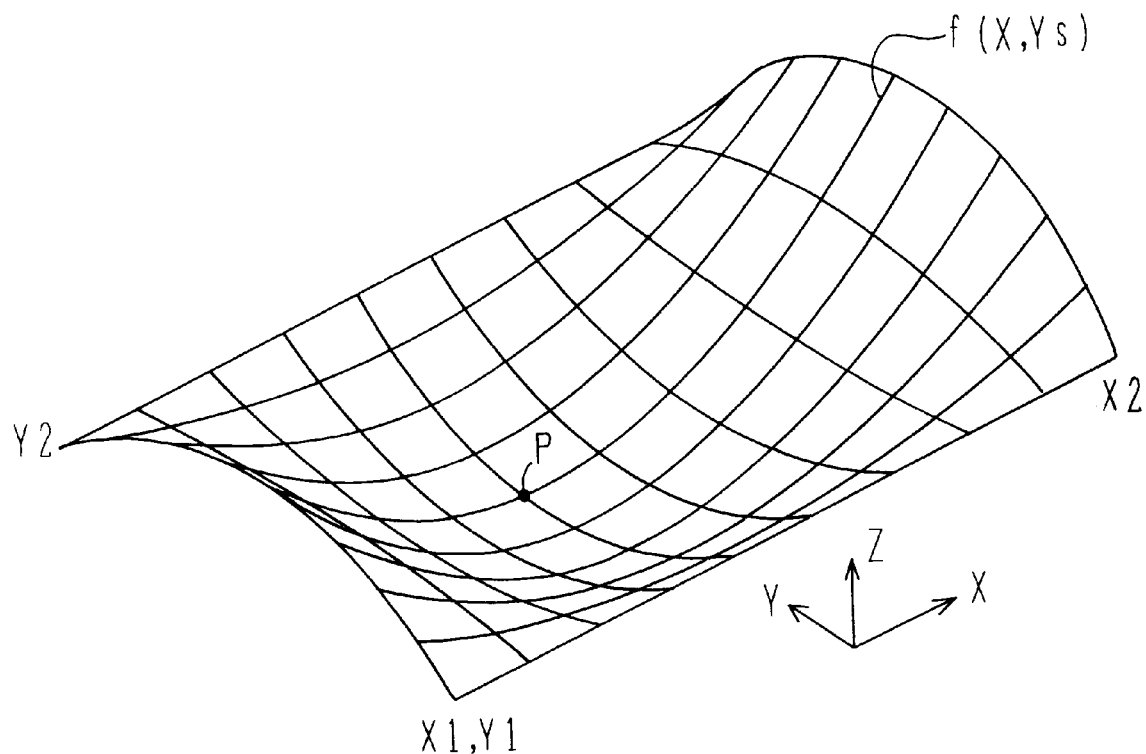
FIG. 12(A) and 12(B) respectively illustrate the processing performed in steps 302 and 303 of FIG. 11.

It would be inefficient to make a judgement as to whether or not the diameter of the ball end mill is appropriate by placing the ball end mill at all the points on the design surface shown in FIG. 12(A), since the quantity of processing would be very great. As a solution, a point at which the curvature is considered to be the smallest is determined as a judging point P and the ball end mill 16A is placed in contact with the judging point P to make a judgment as to whether or not the diameter is appropriate. The curvature may be calculated using a well-known curvature calculation formula.

In an X-Y-Z rectangular coordinate system in which the Z axis is parallel to the vector extending from the lower end toward the upper end of the ball end mill 16A, the design surface is expressed as $Z=f(X, Y)$. The intersection line of a plane parallel to the X-Z plane and the design surface is referred to as an X-Z cross sectional line and the intersection line of a plane parallel to the Y-Z plane and the design surface is referred to as a Y-Z cross sectional line.

Generally speaking, the judging point P is considered to be the point at which Z is at its minimum. Such a judging point P is determined in step 130 of FIG. 10. Details of this processing are illustrated in FIG. 11.

(301) Boundary values X1, X2, Y1 and Y2 of ranges $X1 \leq X \leq X2$ and $Y1 \leq Y \leq Y2$ on the X-Y plane are input by means of the input device 22. An initial value Z0 is substituted in the Z coordinate Zpx of a judging point candidate PX on the X-Z cross sectional line. ZO is a large, arbitrary value. An initial value Y1 is substituted in Ys.

(302) The X-Z cross sectional line $Z=f(X, Ys)$ at Y=Ys is determined.

Figure 12B:
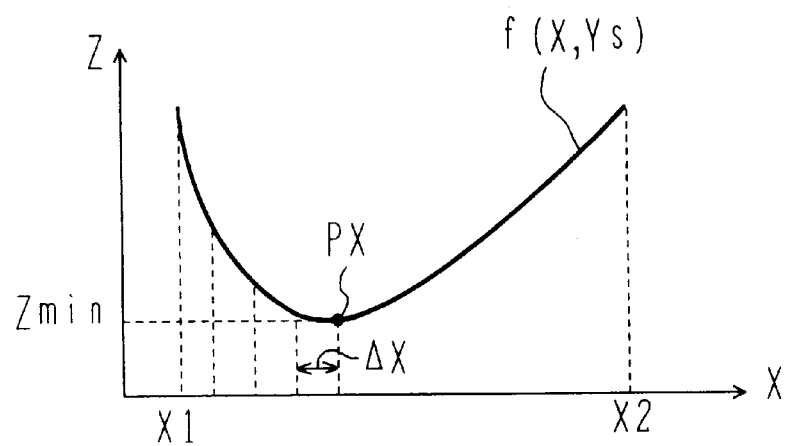

(303) The inclination m of this cross sectional line is calculated to determine the coordinates (Xs, Zs) of a point, that satisfies $|m|<\epsilon$, on the cross sectional line. In this calculation, $\epsilon$ is a small positive value. For instance, as shown in FIG. 12(B), the inclination m of $Z =f(X, Ys)$ is calculated starting from X=X1 for X=X2 sequentially by a step $\Delta X$ until the requirement $|m|<\epsilon$ is satisfied.

(304, 305) If Zs<Zpx then the coordinates of the judging point candidate PX are set to (Xs, Ys, Zs) and Zs is substituted in Zpx.

(306) A step $\Delta Y$ is added to Ys. The step $\Delta Y$ may be, for instance, a half the average value of the diameters of the ball end mills stored in the storage 21.

(307) If $Y \leq Y2$ then the operation returns to step 302, else the operation goes to step 308.

(308) Processing similar to that performed in steps 302 to 307 is executed for the Y-Z cross sectional line to determine the coordinates (Xt, Yt, Zt) of the judging point candidate PY.

(309) The coordinates (Xp, Yp, Zp) of the judging point P are determined from the judging point candidates PX and PY. For instance, if $Zs \leq Zt$ then the judging point candidate PX is set as the judging point P and if not, the judging point candidate PY is set as the judging point P.

(131) An end flag F is set to "0".

(132) The shape data of the ball end mills 16A stored in the storage 21 are read out by one set. This is done sequentially with starting from the largest diameter.

(133) When the reading of the shape data in regard to the diameters of all the ball end mills 16A ends or if the end flag F is equal to "1", the operation proceeds to step 138. Else the operation proceeds to the next step 134.

Figure 13A:
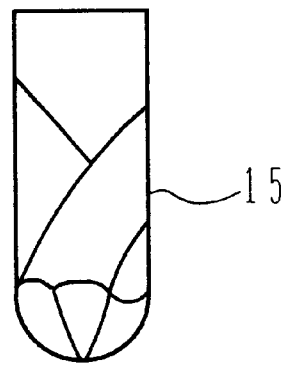
FIG. 13(A) to 13(C) respectively illustrate the processing performed in steps 34 to 36 of FIG. 10.
Figure 13B:
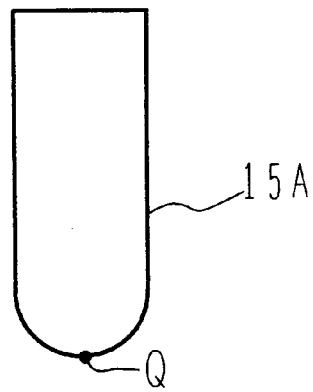

(134) The shape of the ball end mill 16A is rendered into a model. For instance, a mill model 15A shown in FIG. 13(B) is obtained for the ball end mill 16A shown in FIG. 13(A). The mill model 15A is a figure in a plane of symmetry (longitudinal section) of the outline of the rotated ball end mill 16A, and comprises a rectangular portion and a semicircular portion.

Figure 13C:
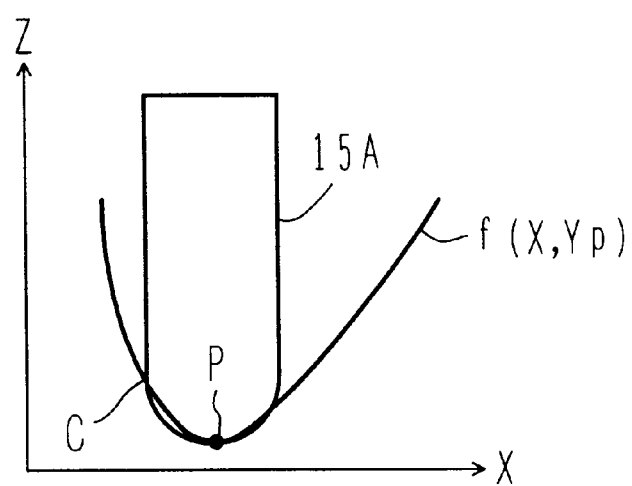

(135, 136) The mill model 15A is virtually placed at the judging point P on a cross sectional line of the design surface as shown in FIG. 13(C) to make a judgment as to whether or not the ball end mill 16A is appropriate. For instance, the mill model 15A is placed so that its lower end point Q is aligned with the judging point P on the X-Z cross sectional line to make a judgment as to whether or not an intersection point C of the X-Z cross sectional line and the mill model 15A exists. If the intersection point C exists, it is decided that the ball end mill 16A interferes with the design surface (interferes with an inner side of the design surface) and is, therefore, not appropriate and the operation returns to step 132, explained earlier. If the intersection point C does not exist, the mill model 15A is placed in such a manner that its lower end point Q is aligned with the judging point P on the Y-Z cross sectional line to make a judgment as to whether or not an intersection point of the Y-Z cross sectional line and the mill model 15A exists. If the intersection point does exist, it is decided that the ball end mill 16A is not appropriate and the operation returns to step 132.

(137) If no intersection point exists, it is judged that the ball end mill 16A is appropriate, its identification code is stored and the end flag F is set to "1".

(138 to 140) If the identification code stored in step 137 exists, the data on the ball end mill 16A corresponding to the identification code are displayed on the display unit 23. Otherwise, the curvature radius r at the judging point P is determined through calculation and a request to make a new ball end mill 16A with a diameter of 2r is issued on the screen.

(141) The operator makes a decision as to whether or not the ball end mill 16A decided upon through the process described above is optimal and selects the ball end mill 16A, which he assumes to be optimal, and inputs its data to the computer 20. When there is a request for making a ball end mill and such a ball end mill must be made and selected, the ball end mill to be made should be selected before it is made.

Since the ball end mill 16A is selected through the process described above, it is possible even for a beginner to select an appropriate ball end mill 16A with a larger diameter compared to the prior art, making it possible to perform milling with a height degree of efficiency.

Variation 1

Figure 14:
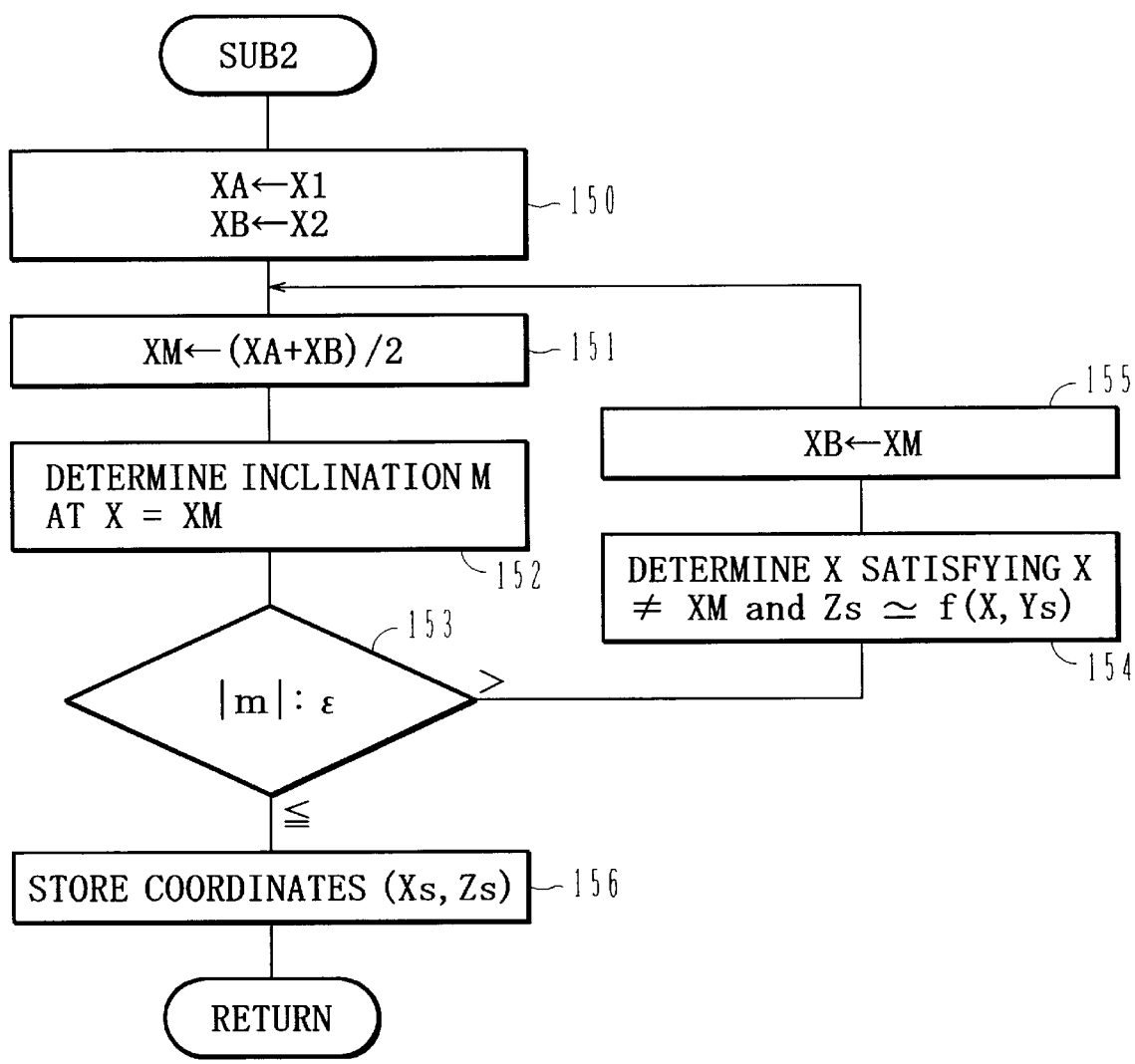
FIG. 14 is a flowchart illustrating a variation of the processing performed in step 303 of FIG. 11.
Figure 15A:
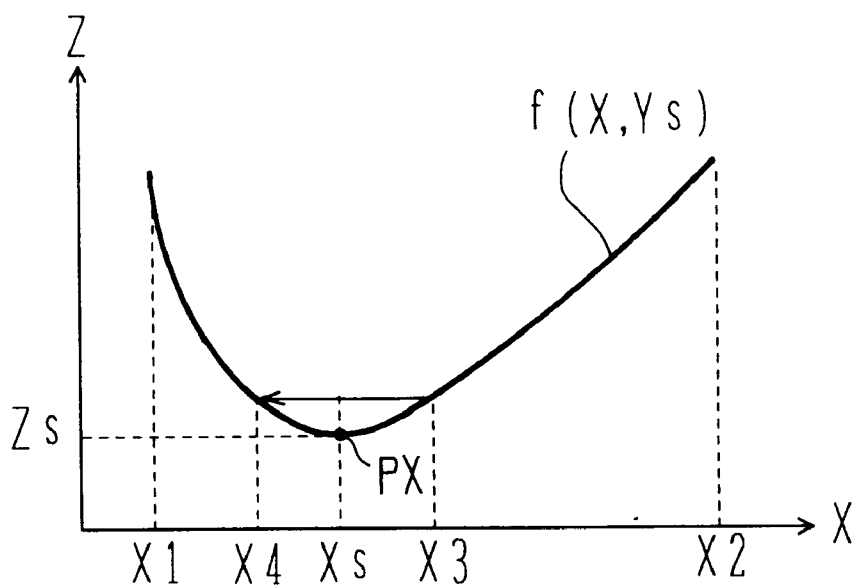
FIG. 15(A) illustrates a variation of the processing performed in step 303 of FIG. 11

FIGS. 14 and 15(A) show a variation of the processing performed in step 303 of FIG. 11.

(150) The lower limit value X1 and the upper limit value X2 of the range of X are respectively substituted in XA and XB as initial values.

(151) The middle point XM=(XA+XB)/2 between XA and XB is determined.

(152) The inclination m of the X-Z cross sectional line at X=XM is determined.

(153) If $|m| \leq \epsilon$ then the operation goes to step 156, else the operation goes to step 154. It is assumed that Zs=f(XM, Ys).

(154, 155) X, which satisfies X≠XM and also satisfies Zs=f(X, Ys) in approximation is determined using, for instance, the half dividing method. This value X is substituted in XA and XM is substituted in XB. Then the operation returns to above step 151.

(156) The coordinates (Xs, Zs) are stored.

The same processing is performed in regard to the Y-Z cross sectional line. Generally, by using such a method, it is possible to determine the judging point P without spending as much time as that required in the method shown in FIG. 12(B).

Variation 2

Figure 15B:
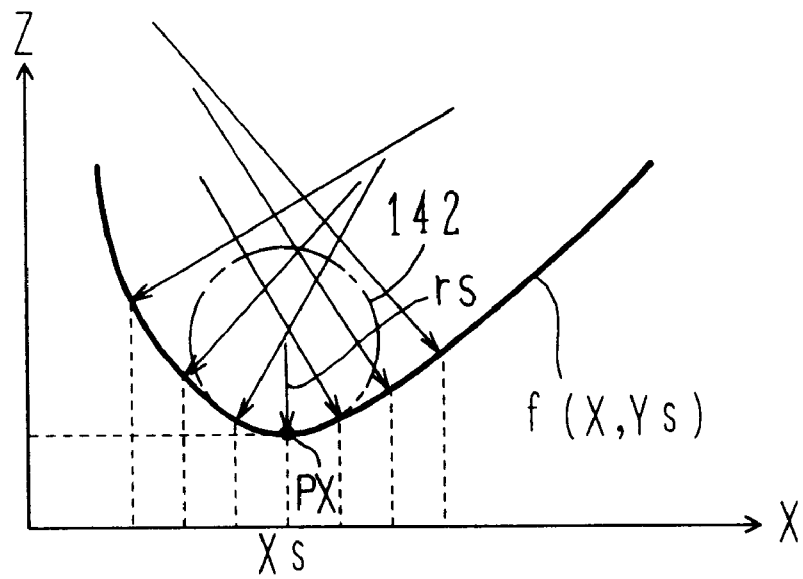
FIG. 15(B) illustrates a variation of the processing performed in step 309 of FIG. 11.

FIG. 15(B) shows a variation of the processing performed in step 309 of FIG. 11.

The curvature radii r of the X-Z cross sectional line at a judging point candidate PX and at positions in its vicinity indicated with dotted lines, are calculated, and the minimum value rs is determined. In FIG. 15(B), the curvature radius at the judging point candidate PX represents the minimum value rs. Reference number 42 indicates a circle with the radius rs. Since the curvature radius at the judging point candidate PX is normally at the minimum value, the curvature radius r may be calculated only at the judging point candidate PX. The same processing is performed for the Y-Z cross sectional line to determine the minimum curvature radius rt. The smaller one of the curvature radii rs and rt is set as the curvature radius rp of the judging point P.

Figure 10:
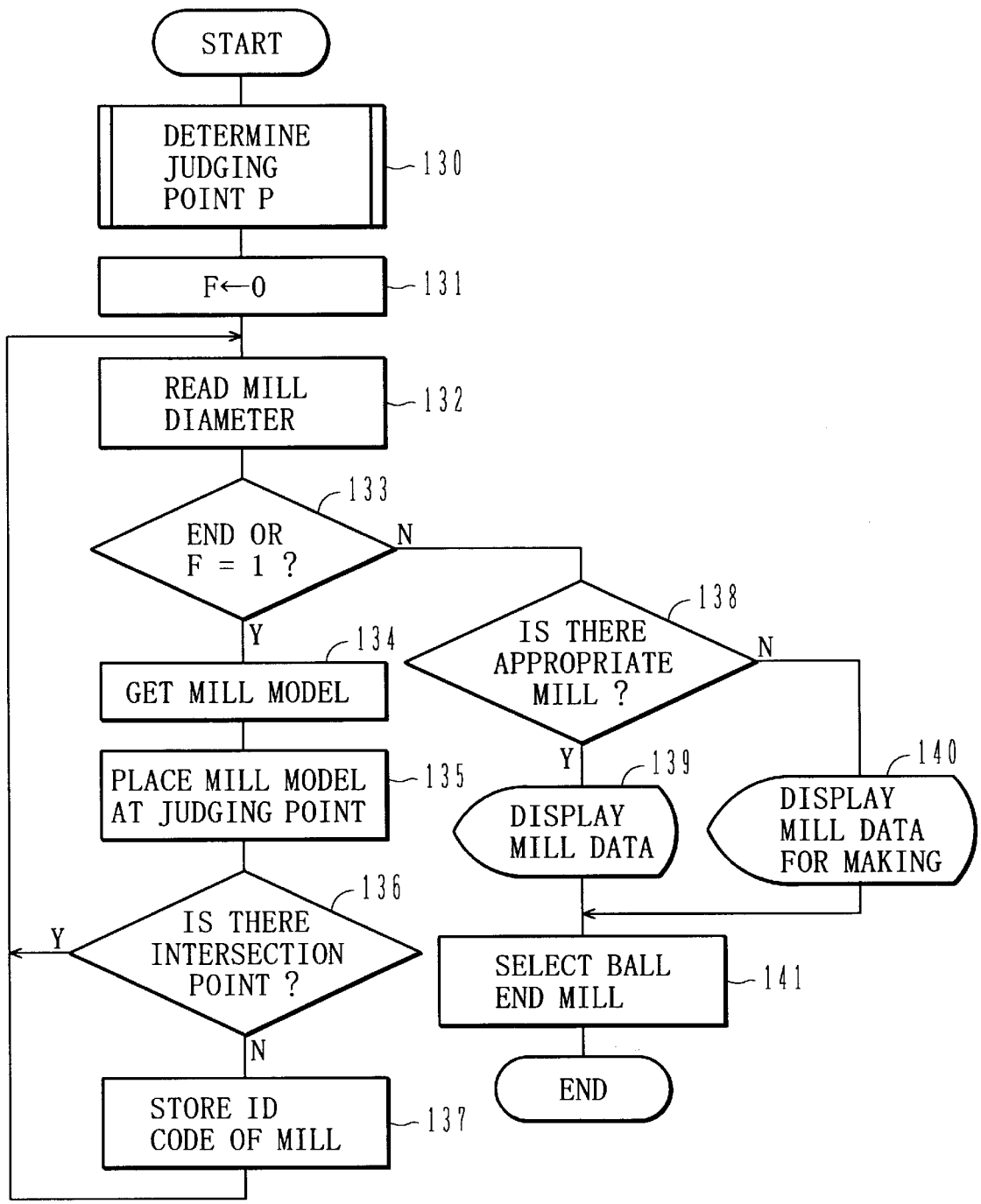
FIG. 10 is a flowchart showing a procedure through which a ball end mill is selected.
Figure 11:
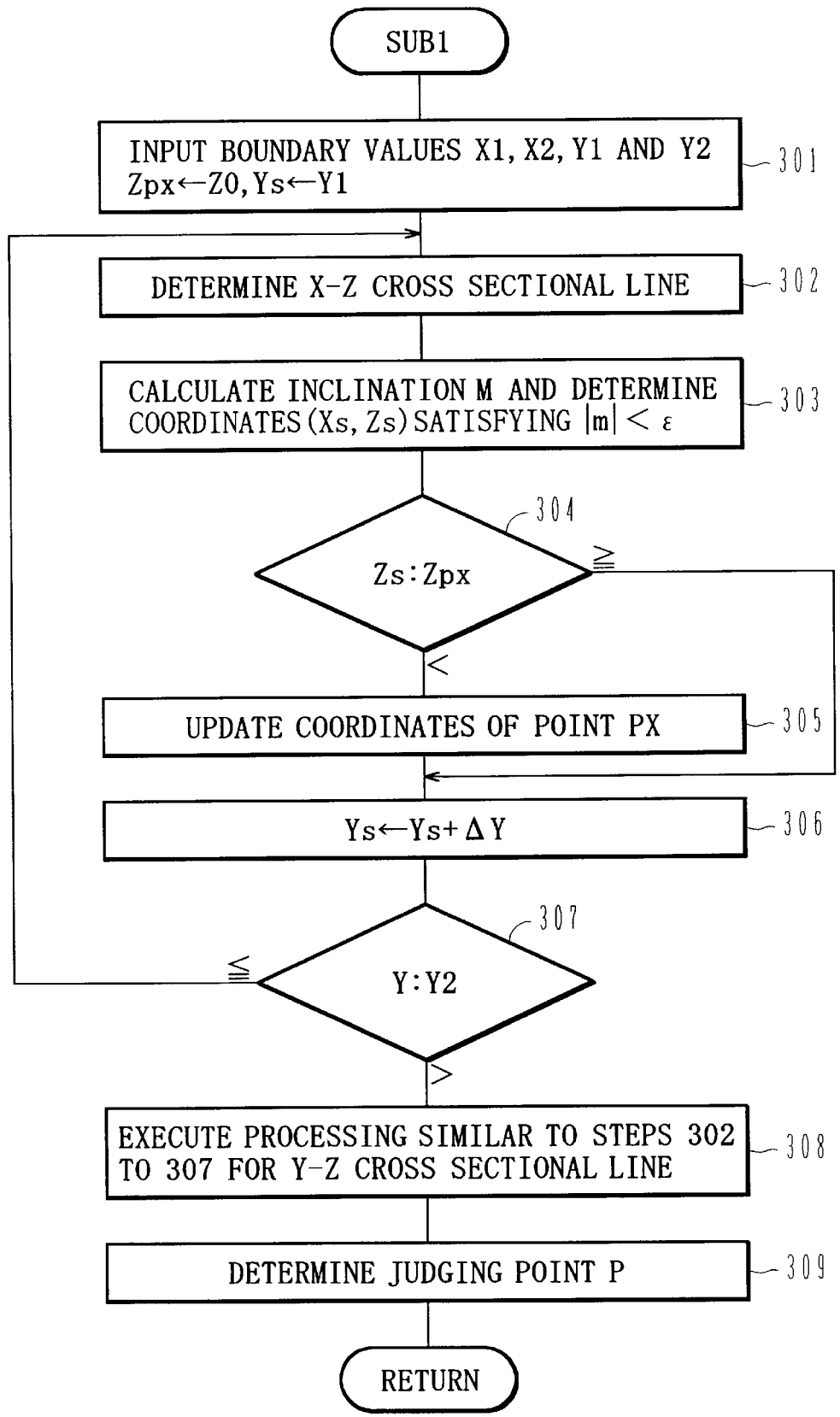
FIG. 11 is a detailed flowchart of the procedure taken in step 30 of FIG. 10.

Instead of performing the processing of steps 35 and 36 in FIG. 10, if $D/2 \leq rp$, where D is the diameter of the ball end mill 16A, then it is judged that the ball end mill 16A is appropriate and the operation goes to step 137 of FIG. 10, else the operation goes to step 132.

By employing this method, it is possible to select a ball end mill 16A with a more desirable diameter without using a mill model 15A.

Offset Milling

Figure 16:
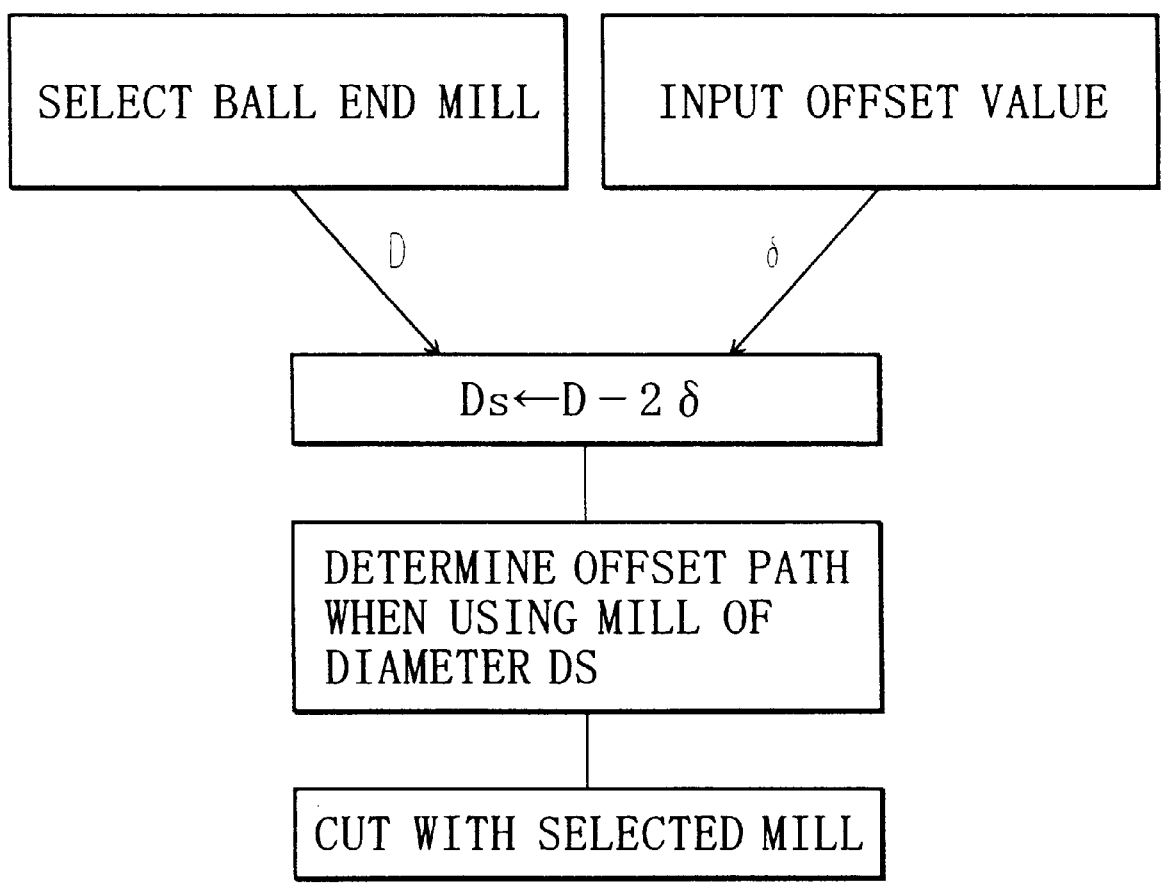
FIG. 16 is a flowchart showing the procedure for offset milling.
Figure 17A:
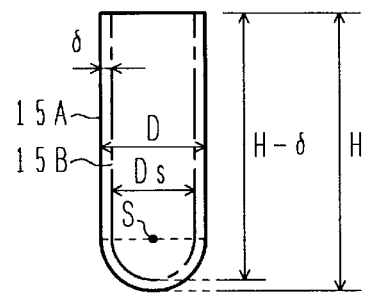
FIGS. 17(A) to 17(C) illustrate the processing of FIG. 16.
Figure 17B:
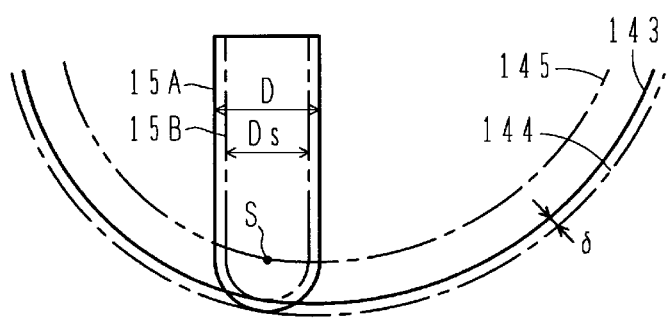
Figure 17C:
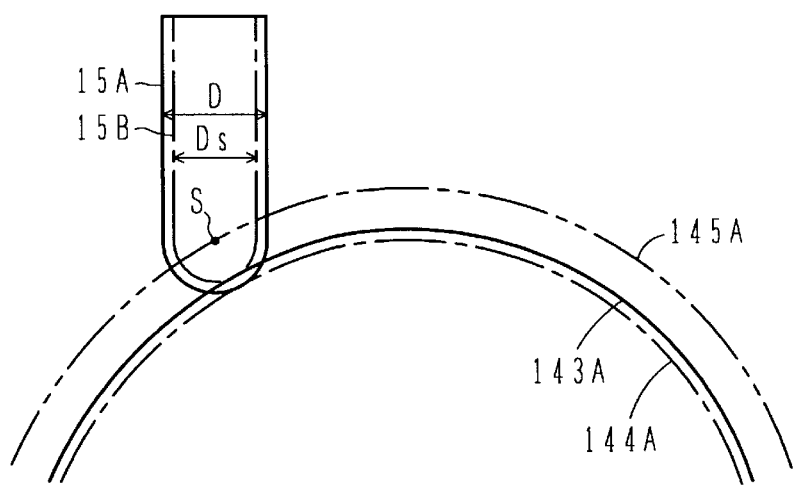

FIG. 16 is a flowchart illustrating the procedure of offset milling and FIGS. 17(A) to 17(C) illustrate the processing performed in FIG. 16.

As shown in FIG. 17(B), after forming a surface 43 by performing milling with a ball end mill in conformance to the design, it may be necessary to perform further milling by a thickness δ by combining a work with another object. In the prior art, a new design surface 44, which is achieved by milling the former design surface 43 by the thickness δ, is obtained and the path of a point S of a ball end mill is determined in correspondence to the new design surface 44 and the ball end mill. Milling is performed with this ball end mill along the path. This prior art method causes the processing complicated. In this processing, as shown in FIG. 17(A), the path calculation point S is the central point of the semicircle at the front end of the mill model 15A for instance.

Since the thickness (offset) δ is normally a small value of approximately 0.5 mm, when the mill model 15A is placed in contact with the new design surface 44, an offset mill model 15B with a height H-δ and a diameter D-2 δ, which is achieved by reducing the outline of the mill model 15A with a height H and a diameter D by the offset δ, will be almost in contact with the former design surface 43. In this case, as shown in FIG. 17(A), the path calculation point S of the offset mill model 15B matches the path calculation point S of the mill model 15A.

Thus, on a hypothesis that the offset mill model 15B is used for the former design surface 43, the computer 20 is made to determine a path 45 of the point S of the offset mill model 15B, a ball end mill that corresponds to the mill model 15A is used in actuality and milling is performed along the path 45.

The method described above may be employed for a projected surface as shown in FIG. 17(C) as well. The former design surface 43A, the new design surface 44A and the path 45A respectively correspond to the former design surface 43, the new design surface 44 and the path 45 of FIG. 17(B).

Determining the path 45 or 45A with this method eliminates the necessity for determining the new design surface 44 or 44A, and simplifies the processing.

Menu Selection

Figure 18:
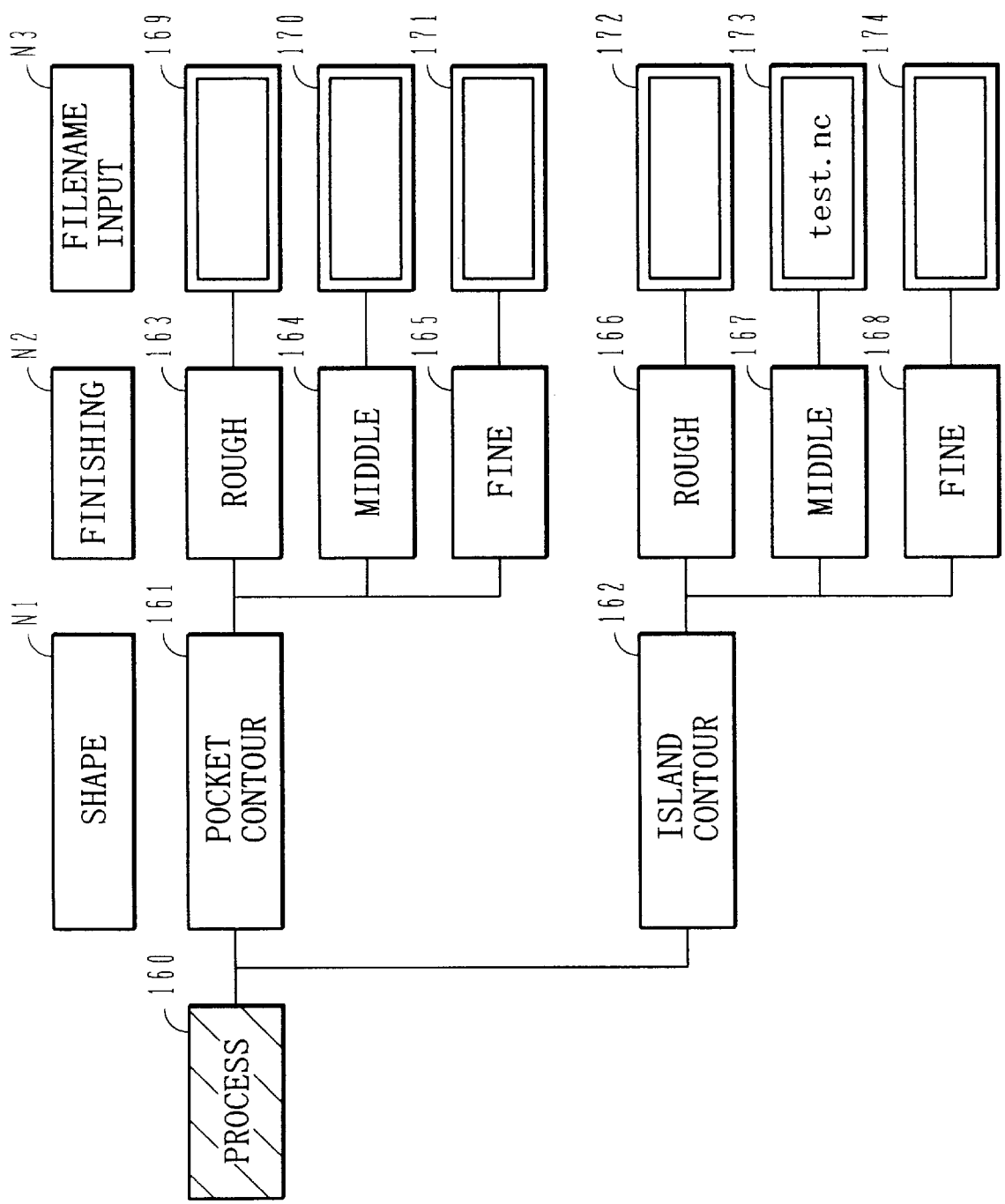
FIG. 18 illustrates a tree-type menu selection display.

FIG. 18 shows a tree-type menu selection screen displayed on the display unit 23 of FIG. 9. In the figure, reference numbers 161 to 168 indicate software switches, reference numbers 169 to 174 indicate text input boxes and reference numbers 160 and N1 to N3 indicate labels.

Before the screen shown in FIG. 18 is displayed, a process 160 and other selection items such as "design surface display" and "ball end mill selection" described above are displayed as menus and by selecting the process 160, the display is switched to the screen shown in FIG. 18.

The selection in the first hierarchical layer in the process 160 is the selection of the shape N1 of the design surface, and the selection items include schematic shapes for the design surface such as a pocket contour (indented contour) 161 and an island contour (indented and projected contour) 162. Depending upon whether the shape is the pocket contour or the island contour, the type of end mill to be used will differ. The selection performed in the second hierarchical layer is the degree of finishing N2 and the selection items include rough finishing 163, middle finishing 164 and fine finishing 165 when the pocket contour 161 is selected and likewise includes rough finishing 166, middle finishing 167 and fine finishing 168 when the island contour is selected. The milling drive speed and the like vary depending upon the degree of finishing selected. The third hierarchical layer is the filename input N3 for NC and the name of an NC file yet to be typed in is input to a selected one of the input boxes 169 to 174.

Figure 19:
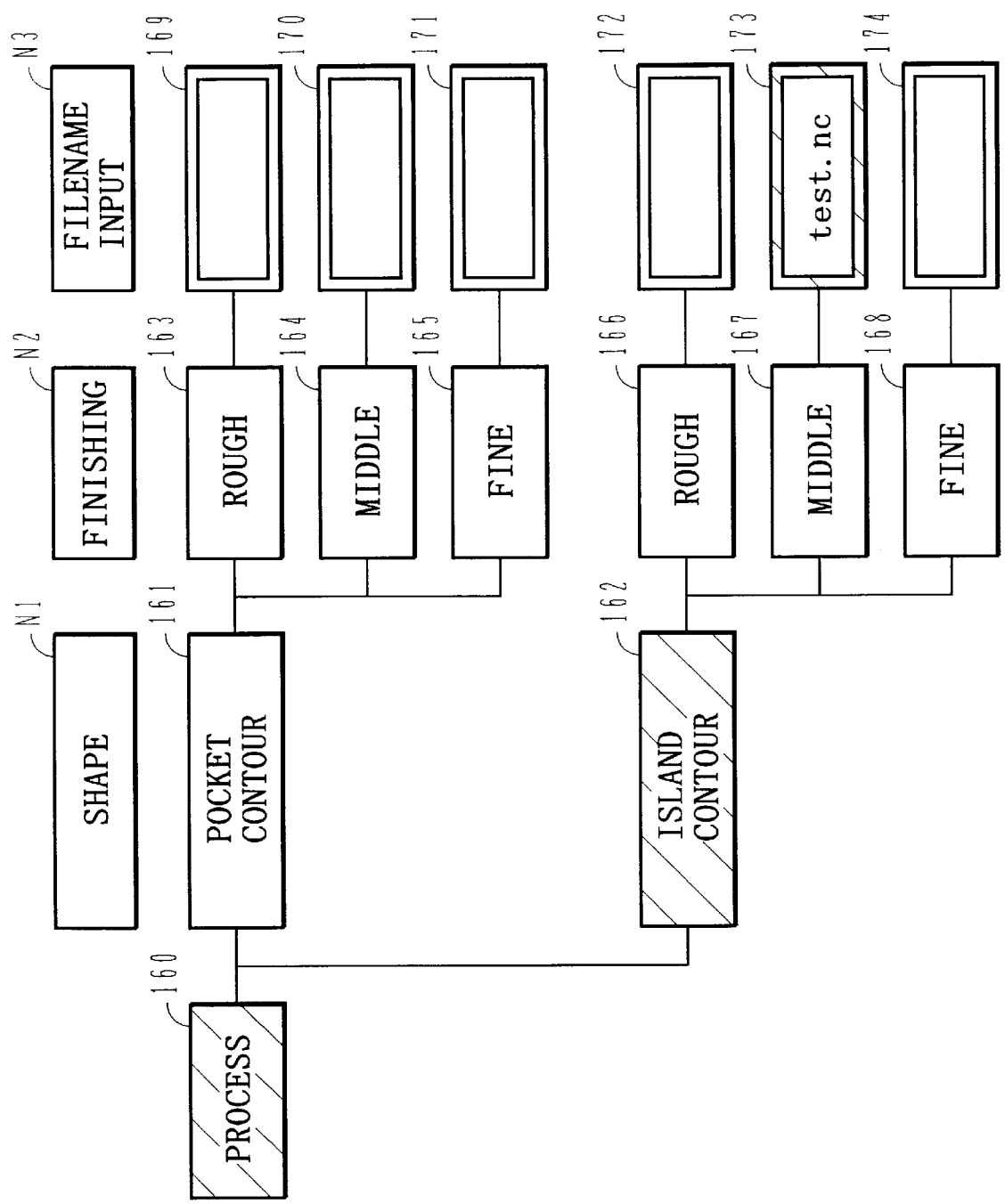
FIG. 19 shows the tree-type menu selection screen in which an item has been selected.

For instance, inputting an NC filename 'test.nc' to the input box 173 will entail selection of the island contour 162 and the rough finishing 167 as well. In order to identify selection items, the software switches indicated with hatching in FIG. 19 may be highlighted or may be displayed in a different color from others. The items thus selected automatically are stored in relation with the NC filename 'test.nc' for use in the processing. For instance, when the island contour 162 is selected, the type of end mill necessary for shaping into the island contour is displayed in the end mill selection menu and when the middle finishing 167 is selected, this is taken into consideration in determining a way of milling when making NC data.

In the prior art, different menus are displayed in different screens sequentially from the upper hierarchical layers toward the lower hierarchical layers in the top down method and items in the menu are selected in each hierarchical layer. Whereas in this embodiment, since the entire hierarchy is displayed in one screen, the overall hierarchical structure can be discerned. Moreover, since selecting an item in a lower hierarchical layer will automatically select related items in hierarchical layers above it, the operation is simplified.

Although preferred embodiments of the present invention has been described, it is to be understood that the invention is not limited thereto and that various changes and modifications may be made without departing from the spirit and scope of the invention.

For instance, in FIG. 10, if a negative judgment is made in step 136 in regard to a ball end mill with the maximum diameter, the operation may proceed from step 138 to step 140.

When using the method shown in FIG. 15(B), if rp-D/2≧d in step 138 of FIG. 10, where d is a constant, it may be judged that no appropriate ball end mill is available and the operation may proceed to step 140.

In reference to FIG. 12(A), a rough judging point P0 may be determined initially by using a cross sectional line with a large pitch and then a fine judging point P1 may be determined by using a cross sectional line with a smaller pitch over a range in the vicinity of the rough judging point P0.

In addition, if the number of hierarchical layers is large in FIG. 18, the entire hierarchy may be divided into a plurality of blocks, and by selecting an item of a lower hierarchical layer in each block, related items in upper hierarchical layers may be selected automatically at the same time. The method shown in FIG. 18 may be applied for any hierarchical menu selection system.

What is claimed is:

1. A milling method using a processor comprising:

determining an end mill path from a design surface of an object, a shape of a block material and a shape of an end mill;

cutting said block material by making said end mill move relative to said block material along said end mill path;

rotating said end mill in order to shape said block material into an object having said design surface;

finding an intersection line of a surface Z=Z1 perpendicular to the Z axis and said design surface, said Z axis being an axial direction of said end mill;

determining offset curves as elements of said end mill path, said elements having approximately equal pitch and being outside from said intersection line;

selecting said elements of said end mill path in order from outside to inside and making said end mill move along said end mill path inside said block material;

finding a second intersection line of a surface perpendicular to said direction Z and a side surface of said block material as a boundary line;

finding intersection points of one of said elements and said material boundary line;

determining a cutting start point and a cutting end point which are said intersection point crossing said material boundary line from outside to inside and from inside to outside respectively when going along said one of said elements in a direction for said end mill to be moved;

determining a tangent to said one of said elements at said cutting start point;

determining a segment of said tangent from an end mill approach start point, which is outside said material boundary line, to said cutting start point as an entering path; and making said end mill move for said cutting start point along said entering path.

2. A milling method according to claim 1, further comprising the steps of:

determining a material boundary offset line which is away from said material boundary line to outside by a length; and finding a intersection point of said material boundary offset line and said tangent as said end mill approach start point.

3. A milling method according to claim 2, further comprising the steps of:

determining an end mill exiting path which is a segment line from said cutting end point to said end mill approach start point; and making said end mill move from said cutting end point to said end mill approach start point along said exiting path.

4. A milling method according to claim 3, further comprising the steps of:

determining an area having a width of said end mill around said exiting path;

judging whether or not said area interferes with said block material; and when having judged as interfering, changing said exiting path into a line which have first and second segment lines extending from said cutting end point and said end mill approach start point respectively in said Z direction to approximate upper plane positions of said block material and a segment line linking both upper end points of said first and second segment lines.

5. A milling method according to claim 4, further comprising the step of adding data on a scan order, rotating and moving speeds of said end mill as attribute data to data on said exiting path, said entering path and said path elements inside said block material.

6. A milling method comprising:

selecting a ball end mill, determining a path of said ball end mill for a design surface based upon said design surface and a shape of said ball end mill, moving said ball end mill along said path and rotating said ball end mill to make a work surface close to said design surface, and, in order to select said ball end mill, (1) finding a point of an approximate minimum height on said design surface as a judging point when a height direction Z extending from a tip to another end of said ball end mill is set; and (2) selecting a ball end mill from a plurality of ball end mills such that said selected ball end mill has a maximum diameter in those not interfering with said design surface when said tip of said ball end mill is aligned with said judging point;

wherein the steps (1) and (2) are executed by a computer.

7. A method according to claim 6, wherein said step (1) comprises the step of:

(1-1) finding each of intersecting lines of a plurality of planes parallel to an X-Z plane in an X-Y-Z rectangular coordinate system and said design surface as an X-Z cross sectional line and finding each of intersecting lines of a plurality of planes parallel to an Y-Z plane and said design surface as an Y-Z cross sectional line; and (1-2) finding a minimum Z point from points on said X-Z cross sectional lines and said Y-Z cross sectional lines as said judging point.

8. A method according to claim 7, wherein said step (1-2) comprises, when X or Y is designated as U, a range U of a U-Z cross sectional line is $U1 \leq U \leq U2$ and $\epsilon$ is a allowable error, the step of:

(a) setting UA=U1 and UB=U2;

(b) determining a height Z=Zp and an inclination m of said U-Z cross sectional line at a middle point UM satisfying UM=(UA+UB)/2; and (c) if $|m|>\epsilon$ then determining U at another point on said U-Z cross sectional line satisfying Z=Zp, substituting U in UA, substituting UM in UB and returning to step (b), else determining Zp as a minimum value.

9. A milling method according to claim 7, wherein said step (2) comprises the steps of:

obtaining a profile of said ball end mill as a mill model;

aligning a tip of said mill model with said judging point; and judging that said ball end mill interferes with said design surface if said mill model intersects said X-Z cross sectional line or said Y-Z cross sectional line.

10. A milling method according to claim 7, wherein said step (2) comprises the steps of:

determining curvature radii of said X-Z cross sectional line and said Y-Z cross sectional line at said judging point; and judging that said ball end mill interferes with said design surface if rp<D/2, where D is a diameter of said ball end mill and rp is a smaller curvature radius in said curvature radii.

11. A milling method according to claim 7, wherein said step (2) comprises the steps of:

determining curvature radii of said X-Z cross sectional line and said Y-Z cross sectional line at said judging point and in a vicinity thereof; and judging that said ball end mill interferes with said design surface if rp<D/2, where D is a diameter of said ball end mill and rp is a smallest curvature radius in said curvature radii.

12. A milling method comprising:

selecting a ball end mill, determining a path of said ball end mill for a new design surface based upon said new design surface and a shape of said ball end mill, moving said ball end mill along said path and rotating said ball end mill to make a work surface close to said new design surface, in case of said work surface being approximately a former design surface and said new design surface being inside of said work by a thickness $\delta$; from said former design surface, determining a mill model by reducing a profile of said ball end mill by said thickness $\delta$;

determining a path of said mill model for getting said former design surface; and moving said end mill along said path to make said work surface into said new design surface.

13. A method of menu selection using a computer and a display device, comprising the steps of displaying a menu on a screen of said display device and inputting commands corresponding to menu selections into said computer, wherein said menu is displayed in a tree-type hierarchical structure and when one item in said menu is selected all related items in hierarchical layers above said one item are selected.

14. A milling method using a computer and a display device, comprising the steps of displaying a menu on a screen of said display device, inputting commands corresponding to menu selections into said computer, selecting a ball end mill, determining a path of said ball end mill for a new design surface based upon said new design surface and a shape of said ball end mill, and moving said ball end mill along said path with rotating said ball end mill to make a work surface close to said new design surface, wherein said menu is displayed in a tree-type hierarchical structure and when one item in said menu is selected all related items in hierarchical layers above said one item are selected.

* * * * *